(12) United States Patent
Shimizu et al.

(10) Patent No.: US 7,826,028 B2
(45) Date of Patent: Nov. 2, 2010

(54) LIQUID CRYSTAL DISPLAY DEVICE

(75) Inventors: Hiromasa Shimizu, Chiba (JP); Tatsuo Hamamoto, Mobara (JP)

(73) Assignee: Hitachi, Ltd., Tokyo (JP)

( * ) Notice: Subject to any disclaimer, the term of this patent is extended or adjusted under 35 U.S.C. 154(b) by 141 days.

(21) Appl. No.: 12/213,741

(22) Filed: Jun. 24, 2008

(65) Prior Publication Data

US 2008/0266511 A1 Oct. 30, 2008

Related U.S. Application Data

(63) Continuation of application No. 11/541,607, filed on Oct. 3, 2006, now Pat. No. 7,456,926, which is a continuation of application No. 10/004,805, filed on Dec. 7, 2001, now Pat. No. 7,133,108.

(30) Foreign Application Priority Data

Dec. 8, 2000 (JP) ............................. 2000-379773

(51) Int. Cl.
G02F 1/1345 (2006.01)

(52) U.S. Cl. .................... 349/156; 349/155; 349/157; 349/158; 349/162; 257/E21.002

(58) Field of Classification Search ......... 349/155–183, 349/162; 257/59, 72
See application file for complete search history.

(56) References Cited

U.S. PATENT DOCUMENTS

| 4,568,149 A | 2/1986 | Sugata et al. |
| 4,763,995 A | 8/1988 | Katagiri et al. |
| 5,459,598 A | 10/1995 | Carrington |
| 5,897,414 A | 4/1999 | Bergeron et al. |
| 6,004,423 A | 12/1999 | Ruedin et al. |
| 6,031,593 A | 2/2000 | Morikawa et al. |
| 6,067,144 A | 5/2000 | Murouchi |
| 6,108,068 A | 8/2000 | Yano et al. |
| 6,181,406 B1 | 1/2001 | Morimoto et al. |
| 6,222,595 B1 * | 4/2001 | Zhang et al. .................. 349/38 |
| 6,414,739 B2 | 7/2002 | Suzuki |
| 6,459,468 B2 | 10/2002 | Shibahara |
| 6,465,268 B2 | 10/2002 | Hirakata et al. |
| 6,501,529 B1 | 12/2002 | Kurihara et al. |
| 6,507,385 B1 | 1/2003 | Nishiyama et al. |
| 6,522,379 B1 | 2/2003 | Ishihara et al. |

(Continued)

FOREIGN PATENT DOCUMENTS

JP 59-139018 1/1983

(Continued)

*Primary Examiner*—Ahmed Sefer
(74) *Attorney, Agent, or Firm*—Stites & Harbison PLLC; Juan Carlos A. Marquez, Esq.

(57) ABSTRACT

In order to prevent irreversible deformation of column-shaped spacers which retain the gap between a pair of substrates between which the liquid crystal layer of a liquid crystal display device is interposed, spacers which assist in preventing such irreversible deformation are newly provided. According to the invention, two or more kinds of spacers which differ in height from a reference surface are disposed on one of the pair of substrates. In addition, a step pattern with which the spacers are to come into contact is formed in advance on the other of the pair of substrates so that the heights of the spacers can be made different.

10 Claims, 14 Drawing Sheets

U.S. PATENT DOCUMENTS

| | | |
|---|---|---|
| 6,535,264 B1 | 3/2003 | Imabayashi et al. |
| 6,583,846 B1 | 6/2003 | Yanagawa et al. |
| 7,248,328 B1 | 7/2007 | Shibahara |
| 2001/0052960 A1 | 12/2001 | Saito et al. |
| 2002/0003519 A1 | 1/2002 | Kim |
| 2002/0008834 A1 | 1/2002 | Suzuki |
| 2002/0054267 A1 | 5/2002 | Matsumoto et al. |
| 2002/0113935 A1 | 8/2002 | Yanagawa et al. |
| 2003/0076471 A1 | 4/2003 | Yanagawa et al. |
| 2005/0122463 A1 | 6/2005 | Byun et al. |

FOREIGN PATENT DOCUMENTS

| | | |
|---|---|---|
| JP | 8-304832 | 8/1985 |
| JP | 63-223728 | 3/1987 |
| JP | 1-54523 | 7/1989 |
| JP | 03-54523 | 7/1989 |
| JP | 03-287127 | 4/1990 |
| JP | 03-223728 | 11/1990 |
| JP | 7-270808 | 3/1994 |
| JP | 10-123534 | 10/1996 |
| JP | 10-153797 | 3/1997 |
| JP | 10-325959 | 5/1997 |
| JP | 11-142863 | 11/1997 |
| JP | 2000-19526 | 6/1998 |
| JP | 2000-75281 | 8/1998 |
| JP | 2000-122071 | 10/1998 |
| JP | 2000-227596 | 2/1999 |
| JP | 2000-267117 | 3/1999 |
| JP | 2000-275654 | 3/1999 |
| JP | 2000-298282 | 4/1999 |
| JP | 2001-142076 | 11/1999 |
| JP | 2001-305561 | 4/2000 |

* cited by examiner

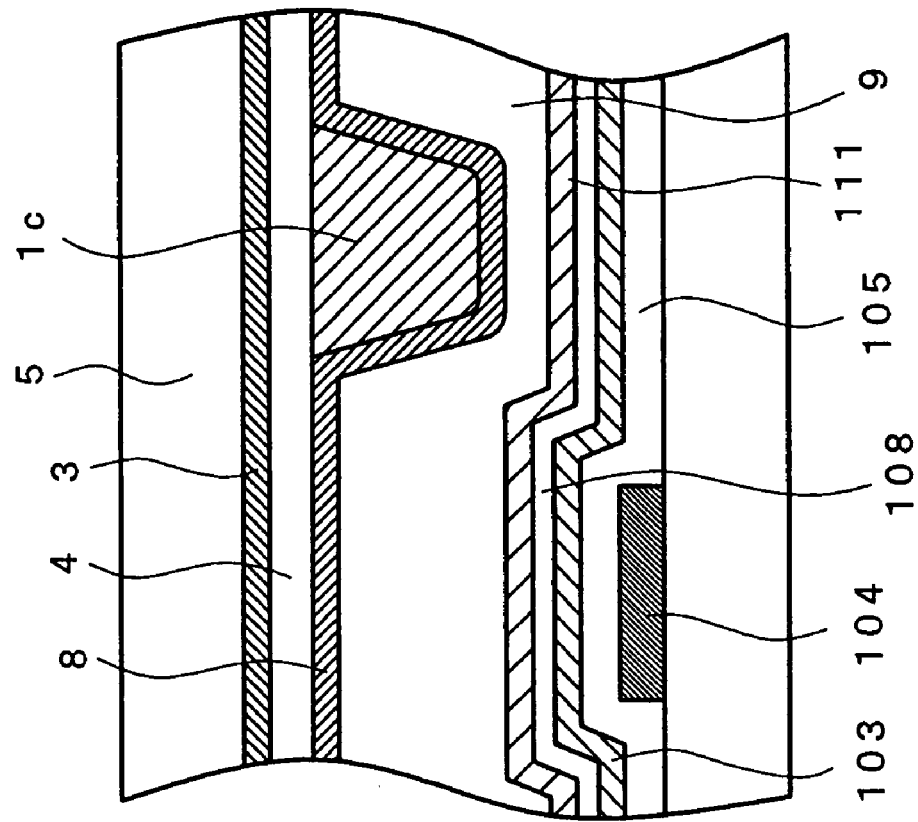
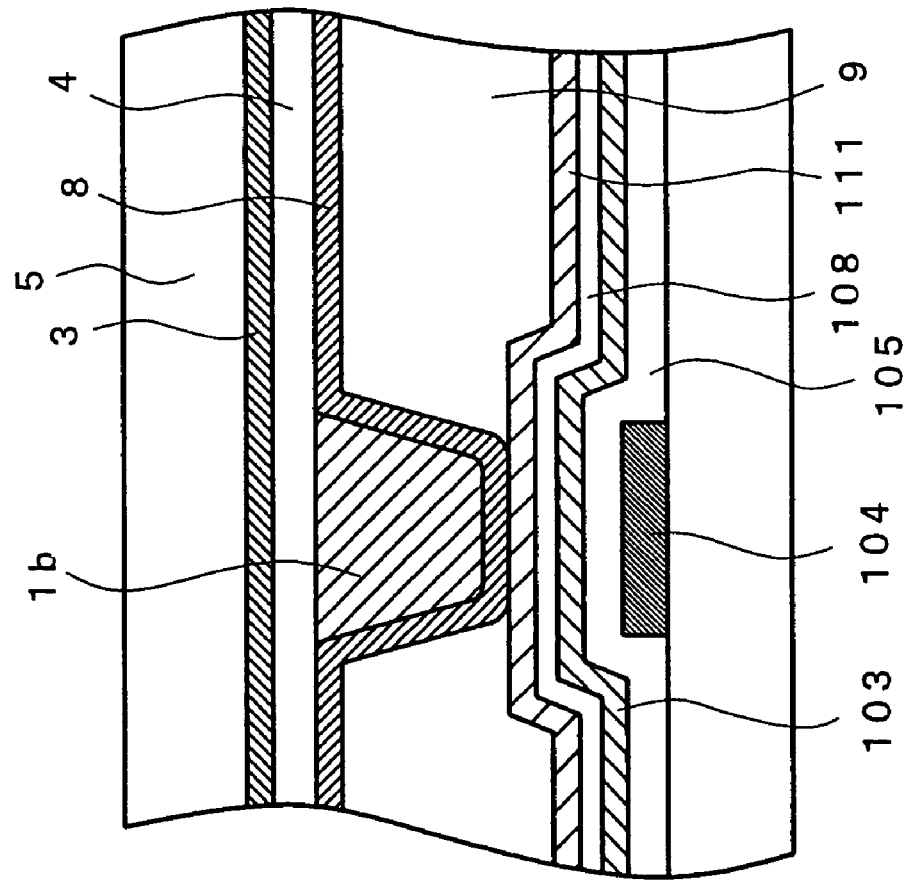

LIQUID CRYSTAL DISPLAY DEVICE

CROSS-REFERENCE TO RELATED APPLICATION

This application is a Continuation application of U.S. application Ser. No. 11/541,607 filed Oct. 3, 2006 now U.S. Pat. No. 7,456,926, which is a Continuation application of U.S. application Ser. No. 10/004,805 filed Dec. 7, 2001 now U.S. Pat. No. 7,133,108. Priority is claimed based on U.S. application Ser. No. 11/541,607 filed Oct. 3, 2006, which claims the priority of U.S. application Ser. No. 10/004,805 filed Dec. 7, 2001, which claims the priority of Japanese Patent Application No. 2000-379773 filed on Dec. 8, 2000, all of which is incorporated by reference.

BACKGROUND OF THE INVENTION

1. Field of the Invention

The present invention relates to a liquid crystal display device and, more particularly, to a liquid crystal display device in which a pair of substrates are opposed to each other with a predetermined gap interposed therebetween by spacer materials and a liquid crystal compound is retained in the gap.

2. Description of the Related Art

In recent years, liquid crystal display devices are widely used as small-sized display devices and display terminals for so-called OA equipment. These kinds of liquid crystal display devices basically include a so-called liquid crystal panel (also called a liquid crystal cell) in which a layer of a liquid crystal compound (or a liquid crystal layer) is interposed between a pair of substrates at least one of which is made of a transparent glass plate, a plastic substrate or the like. Such a liquid crystal panel is generally classified into a type (simple matrix) which selectively applies voltages to various kinds of pixel-forming electrodes formed on the substrates of the liquid crystal panel to change the alignment direction of liquid crystal molecules which constitute a liquid crystal compound of a predetermined pixel portion, thereby forming pixels, and a type (active matrix) in which various kinds of electrodes and pixel-selecting active elements are formed on the substrates of the liquid crystal panel so that selection is made from these active elements to change the alignment direction of the liquid crystal molecules of pixels lying between pixel electrodes and reference electrodes connected to the active elements, thereby forming the pixels.

In general, the active matrix type liquid crystal display device adopts a so-called vertical electric field mode in which an electric field for changing the alignment direction of its liquid crystal layer is applied across an electrode formed on one of its substrates and an electrode formed on the other.

On the other hand, a liquid crystal display device of so-called in-plane-switching mode (abbreviated to IPS mode) in which the direction of an electric field applied to its liquid crystal layer is made parallel to its surface surfaces has been put to practical use. As a disclosed example of this in-plane-switching mode of liquid crystal display device, a liquid crystal display device constructed to obtain a very wide viewing angle by using comb-teeth electrodes on one of two substrates has been known (Japanese Patent Publication No. 21907/1988 and U.S. Pat. No. 4,345,249).

A liquid crystal panel for use in this kind of liquid crystal display device is constructed so that spacers are interposed in the gap between a pair of insulating substrates in which a liquid crystal compound is sealed, in order to hold the gap at a predetermined value.

In general, related-art spacers employ spherical spacers made of a material which contains resin or glass, or spherical spacers made of a similar material and subjected to surface treatment with a coloring agent, an adhesive or an alignment treatment agent, and such spacers are scattered between the electrode-side inner surfaces of the insulating substrates by a static electricity dispersion method, a semi-dry spray method or the like.

In addition, it has also been proposed that instead of such spherical spacers, a predetermined pattern of column-shaped spacers (projections) is formed by a photolithographic technique, a printing technique or the like on at least a part of an area (non-pixel part) shielded from light by a light shield part (a light shield film or a black mask) (Japanese Patent Laid-Open Nos. 325298/1995 and 286194/1996).

SUMMARY OF THE INVENTION

In the aforementioned related art of forming column-shaped spacers on a substrate, one spacer is formed for each pixel. Each of the spacers is secured to one of opposed substrates, and a predetermined area of each of the spacers is in contact with the other. The inventors of the present application, however, have found out the problem that if a multiplicity of spacers are provided, the contact area of spacers becomes wide and frictional force increases. Specifically, if a force is applied from the outside to two opposed substrates of a liquid crystal panel so that their surfaces deviate from each other in parallel, a slight deviation temporarily occurs between the mutually opposed substrates owing to an external force parallel to the substrate surfaces, but if the number (contact area) of spacers is large, the deviation is not restored due to the friction between the spacers and the substrates even after the substrates have been released from the external force.

To solve the above-described problem, it may be considered that the number of spacers is decreased to narrow the contact area. However, if the number of spacers is decreased, another problem occurs. Specifically, when a temporary load is applied from the outside in a direction perpendicular to the substrate surfaces, the limited number of spacers will undergo elastic deformation and the gap between the substrates will become irreversibly locally small resulting in poor display.

Therefore, the present inventors provide a liquid crystal display device in which spacers which, when a temporarily large load is applied from the outside, function to dispersively bear the load are disposed in addition to spacers which function to retain the gap between its substrates.

Several examples of the liquid crystal display device according to the invention will be described below.

A first example of the liquid crystal display device includes a first substrate, a second substrate provided in opposition to the first substrate, a liquid crystal layer provided between the first substrate and the second substrate, and spacers provided on the first substrate, and the liquid crystal layer is provided between the spacers and the second substrate. In other words, at least one of plural spacers formed on a liquid-crystal-layer-side main surface of the first substrate is not brought into contact with a liquid-crystal-layer-side main surface of the second substrate opposed to the first substrate or stacked matter (such as an alignment film, a protective film and video signal lines) provided on the liquid-crystal-layer-side main surface of the second substrate. Accordingly, the liquid crystal compound (liquid crystal layer) is interposed between the at least one spacer and the liquid-crystal-layer-side main surface of the second substrate or the stacked matter provided thereon. In a case where a conductive layer made of an alignment film, a protective film, a conductive oxide or the like is formed on the surface of the at least one spacer, the top surface of such film or layer (if plural films and layers are stacked on the surfaces of the spacers, the uppermost surface of this stacked structure) is spaced apart from the liquid-crystal-layer-side main surface of the second substrate or the stacked matter provided thereon.

A second example of the liquid crystal display device includes a TFT substrate (having a main surface provided with plural pixel areas each having at least a pixel electrode and a switching element connected thereto), a color filter substrate having a main surface on which plural column-shaped spacers are provided (a main surface on which plural projections which become spacers are formed), and a liquid crystal layer provided between the main surface of the TFT substrate and the main surface of the color filter substrate (a liquid crystal compound sealed in the space between the main surfaces of both substrates). The respective column-shaped spacers have depressed surfaces on their surfaces (their top surfaces as viewed from the main surface of the color filter substrate) to be brought into contact with the TFT substrate, and when a force is applied between the TFT substrate and the color filter substrate, at least one of the plural column-shaped spacers is deformed and the depressed surface provided on the top surface of the at least one spacer is also brought into contact with the TFT substrate. The top surface of the at least one column-shaped spacer may be brought into contact with the liquid-crystal-layer-side main surface of the TFT substrate, but also a structure such as a protective film and an alignment film formed on the liquid-crystal-layer-side main surface of the TFT substrate. Switching elements provided on the TFT substrate may be not only so-called field effect thin film transistors but diodes (thin film diodes, TFDs).

A third example of the liquid crystal display device includes a TFT substrate (having a main surface provided with pixel areas each having at least a pixel electrode and a switching element connected thereto), a color filter substrate, and column-shaped spacers which retain the gap between the TFT substrate and the color filter substrate (form a space between the main surfaces of both substrates). The respective column-shaped spacers have contact surfaces which are disposed in contact with a substrate (e.g. one of the TFT substrate and the color filter substrate) and are respectively placed at boundary positions of steps provided on the substrate, and the respective contact surfaces of the column-shaped spacers are disposed in contact with the steps at top-side portions thereof (for example, projecting portions as viewed from the liquid crystal layer) during the state of retaining an ordinary gap between both substrates, but when an external force is temporarily applied, the column-shaped spacers are elastically deformed and are also brought into contact with bottom-side portions of the respective steps (for example, depressed portions as viewed from the liquid crystal layer).

A fourth example of the liquid crystal display device includes a pair of substrates (e.g. a TFT substrate and a color filter substrate), and column-shaped spacers for retaining the gap between both substrates are respectively disposed on the top sides of steps provided within either of the main surfaces of the pair of substrates, while reinforcing spacers for resisting a temporarily applied external force are provided below the steps.

A fifth example of the liquid crystal display device includes a TFT substrate, a color filter substrate, and column-shaped spacers provided between both substrates. The column-shaped spacers are respectively disposed on steps provided on the color filter substrate, and the steps are formed in the step of forming a light shield film pattern or a color filter pattern on the color filter substrate, or in the similar step to this.

These and other objects, features and advantages of the present invention will become more apparent from the following description when taken in conjunction with the accompanying drawings.

BRIEF DESCRIPTION OF THE DRAWINGS

FIGS. 6A and 6B are schematic cross-sectional views showing spacers of the liquid crystal display device according to the embodiment of the invention;

DETAILED DESCRIPTION

A preferred embodiment of the invention will be described below in detail with reference to the accompanying drawings.

Figure 1A:
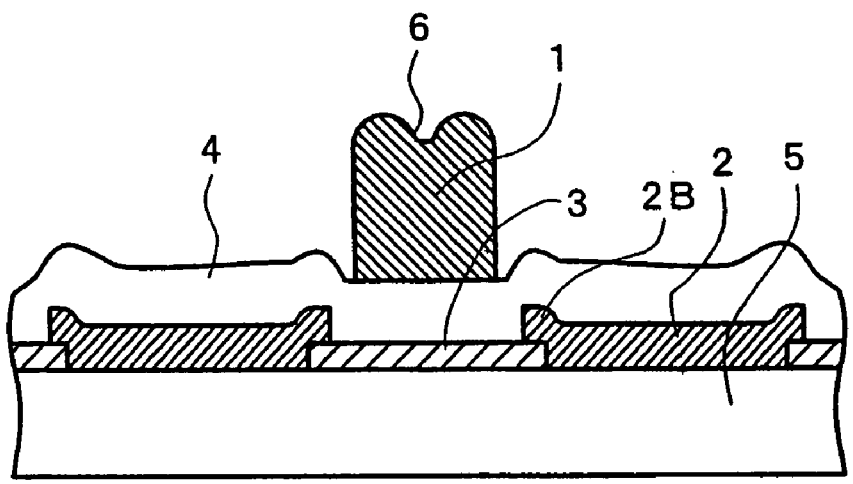
FIG. 1A is a schematic cross-sectional view showing a spacer of a liquid crystal display device according to one embodiment of the invention.
Figure 1B:
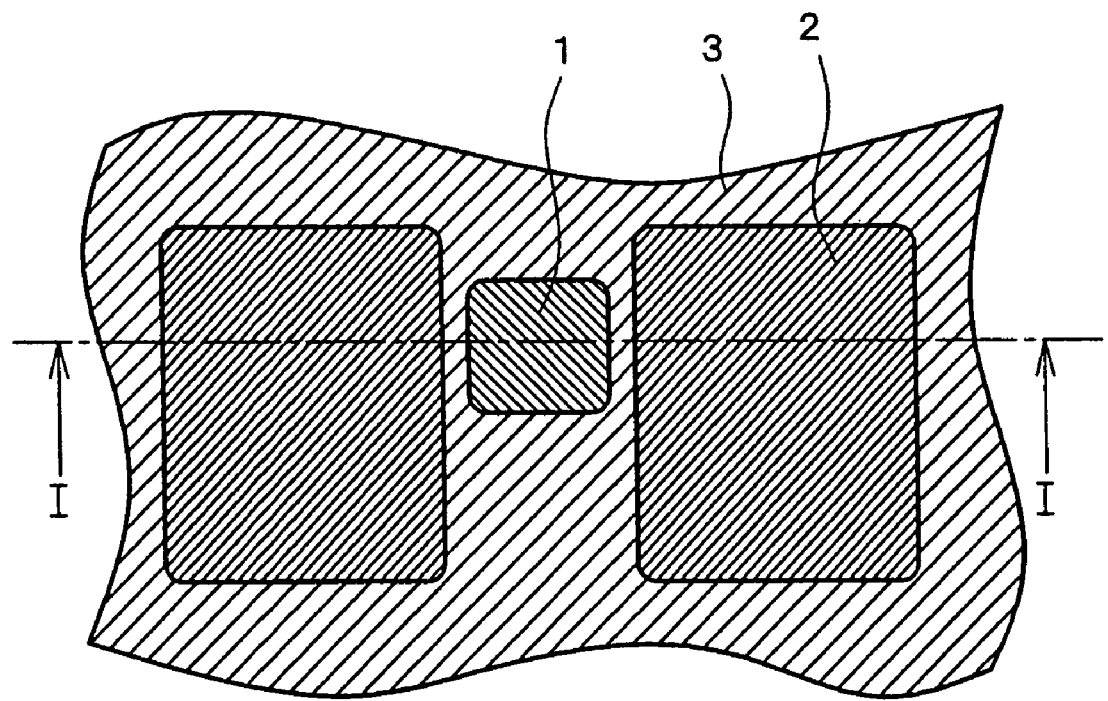
FIG. 1B is its plan view seen from the top side of a substrate.

FIGS. 1A and 1B are schematic views showing part of a color filter substrate, aiding in explaining one embodiment of the liquid crystal display device according to the invention.

FIG. 1A is a cross-sectional taken along line I-I of FIG. 1B. FIG. 1B is a plan view seen from the top side of FIG. 1A.

In FIGS. 1A and 1B, reference numeral 1 denotes a spacer, reference numeral 2 denotes a color filter, reference numeral 3 denotes a black mask, reference numeral 4 denotes a protective film (not shown in FIG. 1B), reference numeral 5 denotes a transparent substrate, and reference numeral 6 denotes a depression provided on the top surface of the spacer 1. The depression 6 will be described later in detail.

As shown in FIGS. 1A and 1B, the black mask 3 is formed on the transparent substrate 5. The black mask 3 is made of a film of black resin or metal, and has the function of blocking light. The color filter 2 is provided in each aperture of the black mask 3. The color filter 2 is made of a resin colored with a pigment or a dyestuff, and passes light of particular wavelength.

The protective film 4 is formed to cover the color filter 2 and the black mask 3. The protective film 4 is also called an overcoat film, and serves to protect a surface of the color filter 2 and the black mask 3 and also to protect a liquid crystal compound from contamination by color filter components. An end portion 2B of the color filter 2 overlaps the black mask 3 and there is a difference in film thickness between the color filter 2 and the black mask 3, so that a step occurs at the end portion 2B of the color filter 2. The protective film 4 also has the effect of burying and leveling the step formed by the color filter 2 and the black mask 3, by covering the color filter 2 and the black mask 3.

The spacer 1 is formed on the protective film 4. The spacer 1 serves to retain a constant gap between the color filter substrate and a TFT substrate (not shown) which is provided in opposition to the color filter substrate as will be described later, and the liquid crystal compound is retained in the gap formed by the spacer 1. As shown in the schematic plan view of FIG. 1, the position where the spacer 1 is formed lies over the black mask 3. Since the spacer 1 is hidden by the black mask 3, the spacer 1 does not stand out when the liquid crystal display device is displaying an image. Incidentally, although FIGS. 1A and 1B show only one spacer 1 on the transparent substrate 5, multiple spacers 1 are formed in matrix form on the entire surface of the transparent substrate 5 (also called the color filter substrate) to retain the constant gap between the top surface of the transparent substrate 5 and another substrate (for example, the TFT substrate) opposed to the top surface.

After the spacer 1 has been formed over the transparent substrate 5, an alignment film (not shown) is formed, and the alignment treatment of rubbing the alignment film with cloth or the like is applied to the alignment film. In this alignment treatment, there occurs the problem that uniform rubbing cannot be effected owing to the protrusion of the spacer 1. To cope with this problem, the spacer 1 is formed at such a position that the portion of the alignment film that is formed over the spacer 1 and may be nonuniformly rubbed during the rubbing treatment of the alignment film is hidden as entirely as possible by the black mask 3.

As described previously, the spacer 1 has the role of keeping constant the gap in which the liquid crystal compound is retained (for example, the thickness of a space which separates the main surface of the color filter substrate and the main surface of the TFT substrate opposed thereto), and it is, therefore, necessary to set the height of the spacer 1 with high accuracy. If the heights of the spacers 1 are not constant, unevenness will occur in the thickness of a liquid crystal layer (the layer of the liquid crystal compound sealed in the space between the substrates). If unevenness occurs in the thickness of the liquid crystal layer, there occurs a problem such as a decrease in display quality due to the occurrence of unevenness in the optical path length of light which passes through the liquid crystal layer. For this reason, during the formation of a layer which becomes the material of the spacer 1, it is necessary to form the layer to a uniform thickness.

As described above, to form such spacers 1, it is necessary to form multiple spacers at particular positions while controlling the respective heights of the multiple spacers with high accuracy. To this end, a method is used in which a layer which becomes the material of the spacers 1 is formed to a uniform thickness and is patterned into a particular shape.

A resin material is used as the material of the spacer 1. As the resin material, it is possible to use, for example, a photosensitive acrylic resin varnish "OPTMER NN500" (OPTMER.RTM.: trade name) which is a negative type resist made by JSR Corporation. The resist material is applied by spin coating or the like to the transparent substrate 5 on which the black mask 3, the color filter 2 and the protective film 4 are formed, and the resist is exposed to the pattern of the spacer 1 by using a mask. After that, the resist is developed with a remover and is cured by heating, thereby forming the spacer 1.

During the formation of the spacer 1, the depression 6 is provided on the top surface of the spacer 1 by appropriately adjusting the photosensitive characteristics of the resist material as well as the characteristics of curing shrinkage of the resist material during heat curing. In this embodiment, because the negative type of resist material is used, a portion having a large amount of exposure is difficult to develop and remove with the remover, whereas a portion having a small amount of exposure is easy to remove. For this reason, by producing a difference in the amount of exposure within each aperture of a photomask, it is possible to form a portion easy to remove and a portion difficult to remove, on the top surface of the spacer 1. In this embodiment, the amount of exposure is made smaller in the central portion of the top surface of the spacer 1 than in the peripheral portion thereof. In one example of such exposure, an opaque film is formed on a transparent substrate member such as a glass substrate, and a photomask is formed by providing apertures (a pattern made of transparent portions) in part of the opaque film. Through this photomask, the opaque film is left to a slight extent, or a mesh- or fringe-shaped opaque pattern is formed, in the central portion of each of the apertures (in the central area of each of the apertures that is spaced part from the periphery thereof), whereby the quantity of light passing through the central portion of each of the apertures is made smaller than the quantity of light passing through the periphery of each of the apertures. Not merely in this example, a light quantity to be irradiated onto the top surface of each spacer is made smaller in the central portion thereof than in the peripheral portion thereof, thereby making slightly incomplete the exposure of a photoresist which constitutes the central portion of the top surface of each spacer. In this manner, the central portion of the top surface of the spacer 1 becomes easier to remove with a remover than does the peripheral portion of the same, whereby the depression 6 is formed.

Since the depression 6 is provided on the top surface of the spacer 1, the highest and neighboring portions of the top surface of the spacer 1 is brought into contact with the opposite TFT substrate to retain the gap between the transparent substrate 5 and the TFT substrate, while when a large load is applied to a liquid crystal panel, the lowest and neighboring areas of the depression 6 are brought into contact with the TFT substrate and dispersively bear the large load. In this case, regarding the area of the top surface that is brought into contact with the opposite TFT substrate, the depressed area of the top surface (the area of a non-contact portion of the top surface) needs to be larger than the depressed area of the same (the area of a contact portion of the same). The required magnitude of a step size (the depth of the depression 6) needs to be larger than or equal to the amount by which the spacer 1 is to be pressed during the assembly of the liquid crystal panel, and the step size is ordinarily approximately +0.2 μm to +0.3 μm.

A pixel area will be described below prior to the description of a position at which to dispose each of the spacers 1 within the liquid crystal panel.

Figure 2:
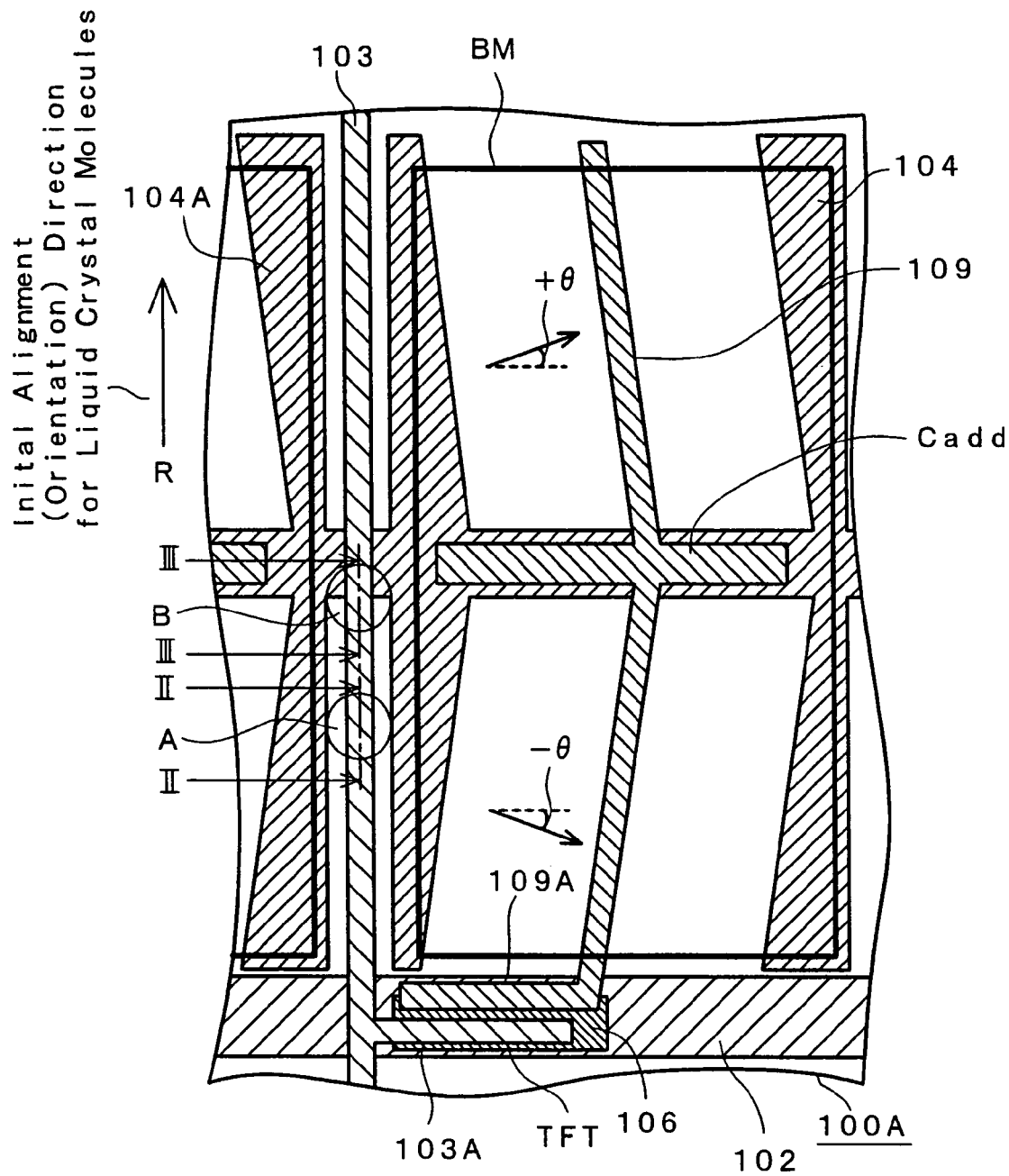
FIG. 2 is a schematic plan view showing the pixel construction of the liquid crystal display device according to the embodiment of the invention.

FIG. 2 is a view showing the construction of one pixel area of the liquid crystal display device according to the invention, and is a plan view showing the liquid-crystal-side surface of the substrate (in this embodiment, the so-called TFT substrate) that is disposed in opposition to the color filter substrate with the liquid crystal interposed therebetween. The construction of the pixel area shown in FIG. 2 is a so-called in-plane-switching type of pixel construction in which the direction of electric fields to be applied to a liquid crystal layer is made approximately parallel to the surfaces of substrates. The liquid crystal display device of this embodiment is constructed to use a liquid crystal having positive dielectric anisotropy.

FIG. 2 shows one pixel for the sake of simplicity of illustration, but within the liquid crystal panel, individual pixels are disposed in matrix form to constitute a display part. For this reason, adjacent pixels exist, respectively, on the right, left, top and bottom side of the one pixel shown in FIG. 2, and the construction of each of the adjacent pixels is the same as that of the one pixel shown in FIG. 2.

In FIG. 2, reference numeral 100A denotes a TFT substrate, and gate signal lines 102 which are extended in the horizontal (x) direction and are juxtaposed in the y direction are formed on the surface of the TFT substrate 100A. These gate signal lines 102 are made of a material such as chromium (Cr).

Each adjacent one of the gate signal lines 102, together with each adjacent one of drain signal lines 103 to be described later (which are extended in the vertical (y) direction and are juxtaposed in the horizontal (x) direction in FIG. 2), is formed to surround a rectangular area, and the rectangular area constitutes one pixel area.

A counter voltage signal line 104 which is extended in the horizontal (x) direction in FIG. 2 through approximately the center of the pixel area is formed of, for example, the same material as the gate signal line 102.

A counter electrode 104A is formed integrally with the counter voltage signal line 104, and the counter electrode 104A, together with the counter voltage signal line 104, is formed in an approximately "H"-shaped pattern within the pixel area. A signal which serves as a reference for a video signal to be supplied to a pixel electrode 109 which will be described later is supplied to the counter electrode 104A via the counter voltage signal line 104 so that electric fields corresponding to the video signal are generated between the pixel electrode 109 and the counter electrode 104A.

Such electric fields have components parallel to the surface of the TFT substrate 100A, and the optical transmissivity of the liquid crystal is controlled by an electric field made of these components.

Incidentally, a reference signal is supplied to the counter voltage signal line 104 from the outside of the display part.

An insulating film 105 (refer to FIG. 3) which is made of, for example, a silicon nitride film SIN is formed on the entire surface of the TFT substrate 100A on which the gate signal line 102 and the counter voltage signal line 104 are formed in the above-described manner.

This insulating film 105 has the function of an interlayer insulating film between the gate signal lines 102 and the drain signal lines 103 which will be described later, the function of gate insulating films for thin film transistors R TFT (which will be described later) in areas in which the respective thin film transistors TFT are formed, and the function of dielectric films for additional capacitances Cadd (which will be described later) in areas in which the respective added capacitances Cadd are formed.

Each thin film transistor TFT is formed to be superposed on the gate signal line 102 at the bottom left of the pixel area as viewed in FIG. 2, and in this area, a semiconductor layer 106 which is formed of, for example, a-Si (amorphous silicon) is formed on the insulating film 105.

A drain electrode 103A and a source electrode 109A are formed on the surface of the semiconductor layer 106, thereby forming a thin film transistor having a reversed-staggered structure which has a gate electrode made of a part of the gate signal line 102 and a gate insulating film made of a part of the insulating film 105.

The drain electrode 103A and the source electrode 109A which overlie the semiconductor layer 106 are formed at the same time as the pixel electrode 109 during the formation of, for example, the drain signal line 103.

The pixel electrode 109 is formed to be extended in the y direction as viewed in FIG. 2 in such a manner as to run through the area between the above-described counter electrodes 104A. In other words, the counter electrodes 104A are disposed on the opposite sides of each of the pixel electrodes 109 in such a manner as to be approximately equally spaced apart from each other in each of the pixel areas, whereby electric fields are generated between the pixel electrode 109 and the counter electrodes 104A.

As is apparent from FIG. 2, the pixel electrode 109 is constructed in, for example, a wedge-shaped pattern which is bent on the counter voltage signal line 104. Each of the counter electrodes 104A opposed to the pixel electrode 109 is constructed to have a width varied so that each of the counter electrodes 104A extends in parallel with the pixel electrode 109.

Specifically, in the case where the bent pixel electrode 109 has a width which is uniform in its longitudinal direction as shown in FIG. 2, each of the counter electrodes 104A positioned on the opposite sides of the pixel electrode 109 is formed to extend in parallel with an adjacent one of the drain signal lines 103 on its side which faces the adjacent drain signal line 103, and in parallel with the pixel electrode 109 on its side which faces the pixel electrode 109.

Owing to this construction, the directions of electric fields E to be generated between the pixel electrode 109 and the counter electrodes 104A become (−).theta. with respect to the counter voltage signal line 104 in the pixel area on the bottom side of FIG. 2 and (+).theta. with respect to the counter voltage signal line 104 in the pixel area on the top side of FIG. 2.

The reason why the directions of the electric fields E are made different in this manner within one pixel area (such directions need not necessarily be made different within one pixel area, and may also be made different between one pixel area and another pixel area) is that the optical transmissivity of the liquid crystal can be varied by rotating part of its liquid crystal molecules in one direction and the other in the opposite direction with respect to a constant initial alignment direction.

By adopting this construction, it is possible to solve a problem due to the viewing-angle dependence of the liquid crystal display panel, i.e., the problem that the reversal phenomenon of luminance is caused when a user turns his eyes on the liquid crystal panel from an oblique direction with respect to the main viewing angle direction thereof.

Incidentally, in this embodiment, an initial alignment direction R of liquid crystal molecules is made approximately coincident with the extension direction of the drain signal line 103, and the rubbing direction (initial alignment direction) of an alignment film which will be described later is made to be a direction along the drain signal line 103.

For this reason, the above-described electric field directions .theta. are set to appropriate values in relation to the initial alignment direction R. In general, the electric field directions .theta. are set so that the absolute value of the angle of each of the electric fields E with respect to the gate signal line 102 becomes smaller than the absolute value of the angle of the same electric field E with respect to the drain signal line 103.

The portion of the pixel electrode 109 that is superposed on the counter voltage signal line 104 is formed to have a large area, and the capacitance element Cadd is formed between that portion and the counter voltage signal line 104. In this case, the insulating film 105 is used as a dielectric film.

This capacitance element Cstg is formed for the purpose of, for example, enabling a video signal supplied to the pixel electrode 109 to be stored therein for a comparatively long period. Specifically, when a scanning signal is supplied to the thin film transistor TFT from the gate signal line 102, the thin film transistor TFT is turned on and a video signal from the drain signal line 103 is supplied to the pixel electrode 109 via the thin film transistor TFT. After that, even in the case where the thin film transistor TFT is turned off, the video signal supplied to the pixel electrode 109 is stored therein by the capacitance element Cadd.

A protective film 108 (refer to FIG. 3) made of, for example, a silicon nitride film is formed on the entire surface of the TFT substrate 100A formed in this manner, whereby, for example, the thin film transistor TFT can be prevented from being brought into contact with the liquid crystal.

Furthermore, an alignment film 111 (refer to FIG. 3) which determines the initial alignment direction of the liquid crystal is formed on the top surface of the protective film 108. This alignment film 111 is formed by depositing, for example, a synthetic resin film on the protective film 108 and effecting rubbing treatment on the surface of the synthetic resin film in the extension direction of the drain signal line 103 as described previously.

A color filter substrate 100B is disposed in opposition to the TFT substrate 100A constructed in this manner, with a liquid crystal layer 9 interposed therebetween. As described previously, the color filter substrate 100B has a construction in which the black mask 3 which separates the individual pixel areas is formed on the liquid-crystal-side surface of the transparent substrate 5 and the color filters 2 for predetermined colors are formed in the respective apertures of the black mask 3. Incidentally, in FIG. 2, sign BM denotes an outline which corresponds to one of the apertures of the black mask 3.

Figure 3:
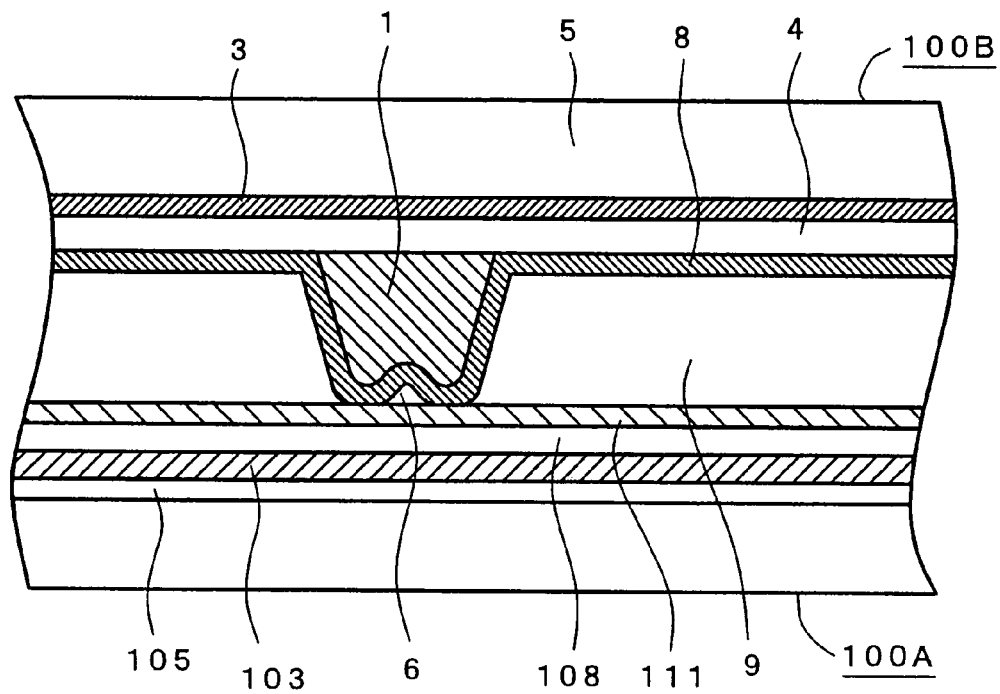
FIG. 3 is a schematic cross-sectional view showing the spacer of the liquid crystal display device according to the embodiment of the invention.

FIG. 3 is a cross-sectional view showing a case where the spacer 1 is provided at a location indicated at A in FIG. 2. FIG. 3 is also a cross-sectional view taken along line II-II of FIG. 2. The spacer 1 shown in FIG. 3 is provided between the black mask 3 of the color filter substrate 100B and the drain signal line 103 of the TFT substrate 100A. The spacer 1 formed on the color filter substrate 100B is in contact with the TFT substrate 100A, but the depression 6 is formed on the surface of the spacer 1 that is brought into contact with the TFT substrate 100A.

In general, the liquid crystal panel is manufactured by sticking together two substrates, i.e., the TFT substrate 100A and the color filter substrate 100B. In the process of manufacturing the liquid crystal panel, the TFT substrate 100A and the color filter substrate 100B are disposed to oppose each other with a gap in which to interpose the liquid crystal layer 9 being provided therebetween. The spacer 1 forms the gap in which to seal the liquid crystal, and is provided between the TFT substrate 100A and the color filter substrate 100B to keep constant the layer thickness of the liquid crystal layer 9. A sealing material for adhesion is applied to the peripheral portion of each of the TFT substrate 100A and the color filter substrate 100B that are disposed in opposition to each other, and then, the TFT substrate 100A and the color filter substrate 100B are stuck together by pressure. In this pressure-sticking step, the spacer 1 is pressed against the TFT substrate 100A.

As shown in FIG. 3, the depression 6 is formed in the spacer 1, whereby when the liquid crystal panel is assembled with the TFT substrate 100A being stuck to the color filter substrate 100B by pressure, a portion which is in contact with the TFT substrate 100A and a portion which is not in contact with the TFT substrate 100A are produced on the spacer 1. In this manner, the portion which is in contact with the TFT substrate 100A and the portion which is not in contact with the TFT substrate 100A and has the liquid crystal layer 9 between itself and the TFT substrate 100A are provided on the surface of the spacer 1 that is opposed to the TFT substrate 100A, whereby it is not merely possible to obtain the portion which is in contact with the TFT substrate 100A in order to retain a normal substrate gap, but when a temporarily large load is externally applied perpendicularly to the substrate surfaces, it is possible to dispersively bear such load. In addition, since the area of the spacer 1 that is in contact with the TFT substrate 100A is ordinarily small, the spacer 1 is also effective on the problem that in the case where an external force parallel to the substrate surface is applied to the spacer 1, even if the spacer 1 is released from the external force, the spacer 1 cannot be restored from its displacement, owing to friction.

A position where the spacer 1 is formed and an alignment defect due to the spacer 1 will be described below. The spacer 1 shown in FIG. 3 is formed at the portion indicated at A in FIG. 2, and the portion indicated at A is positioned between the drain signal line 103 and the black mask 3 and is effective in making inconspicuous an alignment defect caused by the spacer 1. In other words, since the drain signal line 103 is approximately parallel to the initial alignment direction indicated by an arrow R in FIG. 2, the alignment defect caused by the spacer 1 during rubbing treatment can be hidden by the black mask 3.

Figure 4:
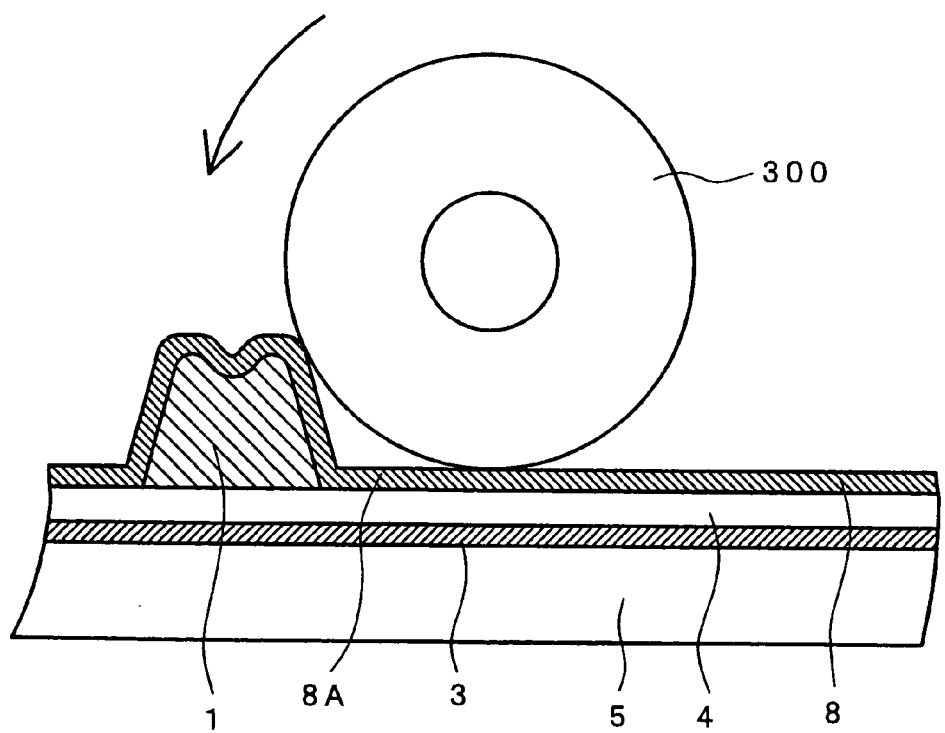
FIG. 4 is a schematic view aiding in describing a rubbing method for the embodiment of the invention.

The alignment defect caused by the spacer 1 will be described below with reference to FIG. 4. As shown in FIG. 4, rubbing treatment is in general performed by bringing a roller 300 into contact with an alignment film 8 while rotating the roller 300, and rubbing the alignment film 8 with the roller 300. During this time, since the spacer 1 projects from the color filter substrate, the roller 300 floats upward from the alignment film 8, so that a portion 8A where sufficient alignment cannot be effected occurs at the back side of the spacer 1. In this portion 8A where sufficient alignment cannot be effected, there occurs a display which is nonuniform with respect to that in the other portion, so that display irregularity occurs.

However, in the case where the spacer 1 is provided on the drain signal line 103 which is approximately parallel to the initial alignment direction, the roller 300 moves approximately in parallel with the drain signal line 103, so that the portion 8A where sufficient alignment cannot be effected occurs between the drain signal line 103 and the black mask 3. Therefore, display irregularity due to the portion 8A where sufficient alignment cannot be effected can be hidden by the black mask 3.

Figure 5:
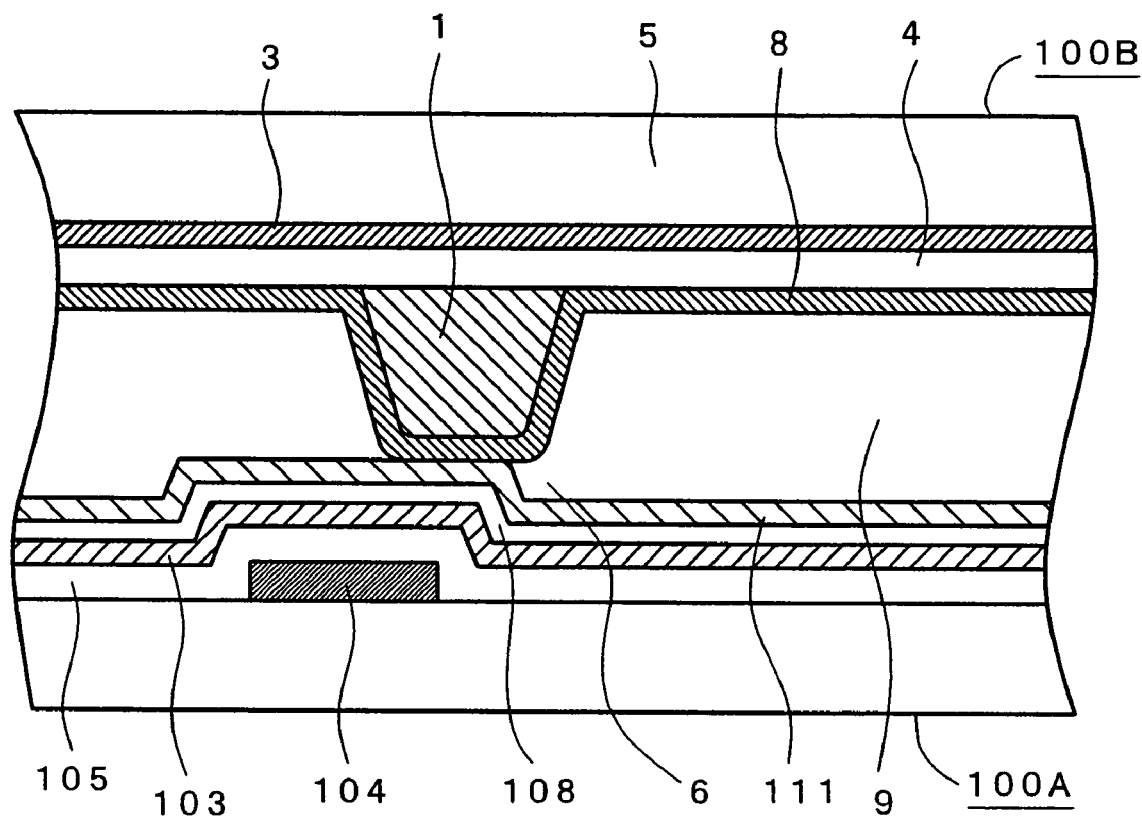
FIG. 5 is a schematic cross-sectional view showing a spacer of the liquid crystal display device according to the embodiment of the invention.

FIG. 5 is a cross-sectional view showing a case where the spacer 1 is provided at a location indicated at B in FIG. 2. FIG. 5 is also a cross-sectional view taken along line III-III of FIG. 2. In FIG. 5, the spacer 1 is provided between the black mask 3 of the color filter substrate 100B and the intersection of the drain signal line 103 and the counter voltage signal line 104 on the TFT substrate 100A.

As shown in FIG. 5, a step is formed at the intersection of the drain signal line 103 and the counter voltage signal line 104. By utilizing this step, even if the top surface of the spacer 1 is flat, it is possible to realize a construction in which when a large load is applied, the step of the substrate 104A can be utilized to increase the area of the portion of the spacer 1 that is in contact with the substrate 104A, thereby dispersing the large load. In other words, in an ordinary case, part of one spacer is in contact with the substrate to retain the gap between the substrates, but in the case where the spacer receives a large load, the spacer undergoes elastic deformation and the portion of the spacer that is out of contact with the substrate 104A because of the presence of such step also comes into contact with the substrate 104A and bears the large load.

In the case where steps present on a substrate are utilized, locations where spacers are to be disposed can be selected from among locations where the steps are originally present on the substrate, for example, locations on a TFT substrate where interconnection lines overlap one another, or locations on a color filter substrate where a color pattern overlaps a black mask pattern.

Figure 7:
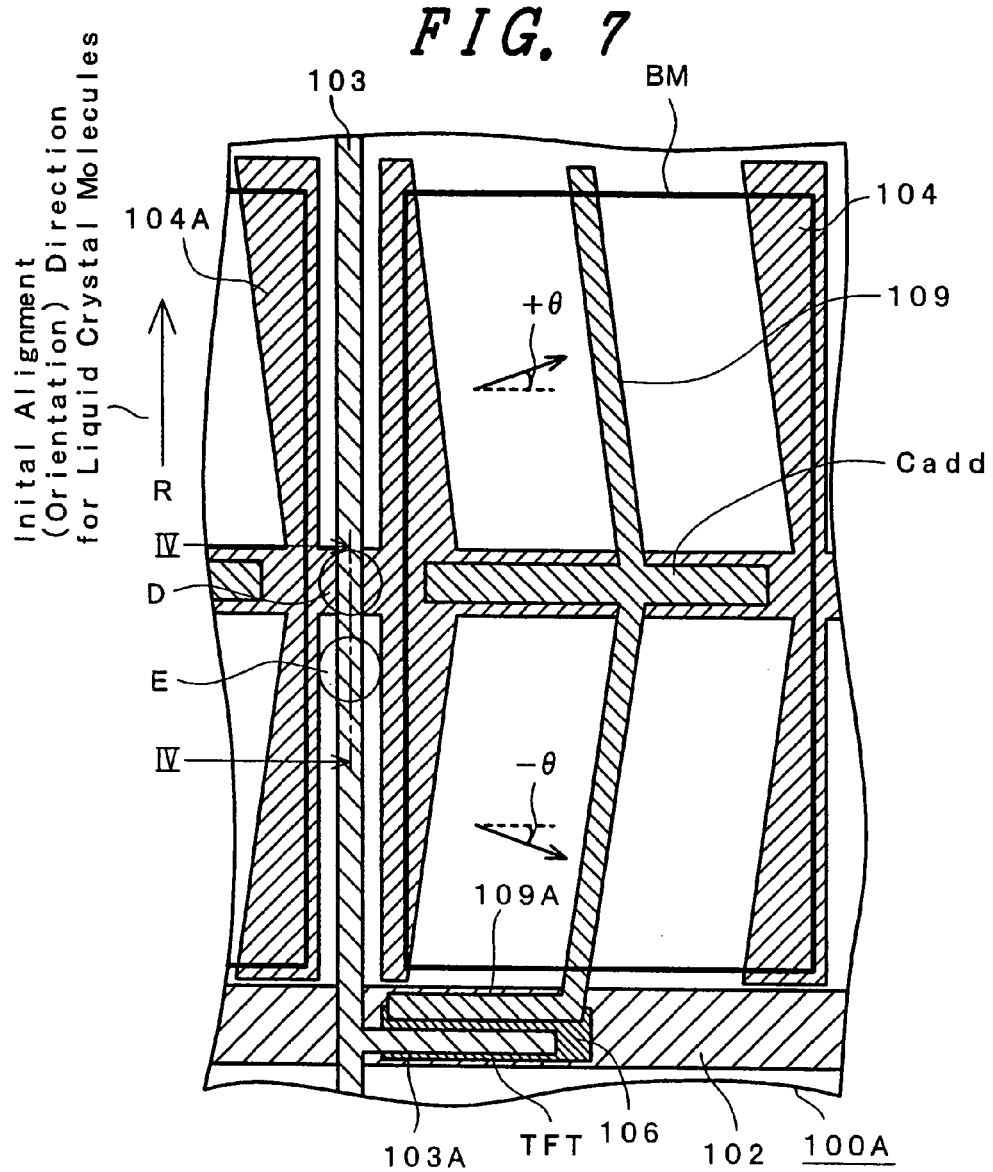
FIG. 7 is a schematic plan view showing another pixel structure of the liquid crystal display device according to the embodiment of the invention.

FIGS. 6A and 6B are cross-sectional views showing a case where a spacer is provided at a location indicated at D or E in FIG. 7. FIGS. 6A and 6B are cross-sectional views taken along line IV-IV of FIG. 7. FIG. 6A shows a case where a spacer 1b is provided at the location indicated at D in FIG. 7, while FIG. 6B shows a case where a spacer 1c is provided at the location indicated at E in FIG. 7. In FIG. 6A, the spacer 1b is provided between the black mask 3 of the color filter substrate 100B and the intersection of the drain signal line 103 and the counter voltage signal line 104 on the TFT substrate 100A. Since the spacer 1b shown in FIG. 6A is provided at the intersection of the drain signal line 103 and the counter voltage signal line 104, the spacer 1b is provided at a position which is increased in thickness by the thickness of the counter voltage signal line 104. In the case shown in FIG. 6B, a spacer 1c is provided over the drain signal line 103, and since the spacer 1c has approximately the same height as the spacer 1b provided in the construction shown in FIG. 6A, a gap which is approximately equal to the thickness of the counter voltage signal line 104 occurs between the spacer 1c and the TFT substrate 100A unlike the construction shown in FIG. 6A, and a liquid crystal is present in the gap. In other words, the spacer 1b formed at the position shown in FIG. 6A is ordinarily placed in contact with the TFT substrate 100A, and works to form and maintain the gap between the TFT substrate 100A and the color filter substrate 100B. The spacer 1c formed at the position shown in FIG. 6B ordinarily is not in contact with the TFT substrate 100A, but if a force perpendicular to both substrates is applied from the outside, the spacer 1b shown in FIG. 6A is pressed and elastically deformed, so that the gap between the TFT substrate 100A and the color filter substrate 100B becomes narrow and the spacer 1c also comes into contact with the TFT substrate 100A and bears the load. Within one liquid crystal panel, by selecting positions where to form such spacers, it is possible to appropriately adjust the number of spacers 1b and spacers 1c, whereby it is possible to realize a liquid crystal display device which can cope with perpendicular or horizontal external forces relative to its liquid crystal panel without any problem.

Figure 8:
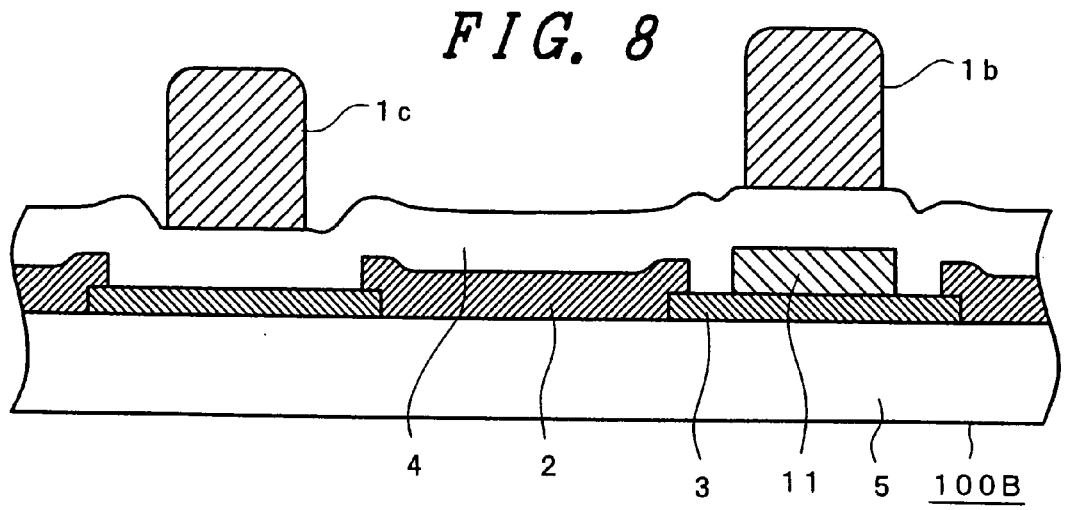
FIG. 8 is a schematic cross-sectional view showing spacers of the liquid crystal display device according to the embodiment of the invention.

FIG. 8 shows a case where a step for the spacer 1 is provided on the color filter substrate 100B. As shown in FIG. 8, a base pattern 11 is formed under the spacer 1 at the same time that the black mask 3 or the color filter pattern 2 is formed. In the case shown in FIG. 8, the base pattern 11 is formed at the same time as the formation of the color filter 2. However, since the protective film (leveling film) 4 is formed to overlie the base pattern 11, the resultant step becomes small owing to its leveling effect. Accordingly, the size of the step is adjusted by changing the size and shape of the base pattern 11.

As shown in FIG. 8, since the spacer 1b is provided over the base pattern 11, the spacer 1b is provided at a position which is increased in thickness by the thickness of the base pattern 11. On the other hand, the spacer 1c is provided over the black mask 3 on which the base pattern 11 is not provided. The spacer 1c is formed by patterning a resin layer which has approximately the same film thickness as the spacer 1b, and in the case where the liquid crystal panel is assembled, a gap occurs between the top surface of the spacer 1c and the opposed color filter substrate (not shown) and the liquid crystal is present in the gap. Specifically, the spacer 1b is ordinarily placed in contact with the TFT substrate, and works to form and maintain the gap between the TFT substrate and the color filter substrate 100B. On the other hand, the spacer 1c ordinarily is not in contact with the TFT substrate, but if a force perpendicular to both substrates is applied from the outside, the spacer 1b is pressed and elastically deformed, so that the gap between the TFT substrate and the color filter substrate 100B becomes narrow and the spacer 1c also comes into contact with the TFT substrate and bears the load. Within one liquid crystal panel, by selecting positions where to form such base patterns 11, it is possible to appropriately adjust the number of spacers 1b and spacers 1c.

FIGS. 9A to 9D show a process diagram for forming the base pattern 11. In the step shown in FIG. 9A, a metal film (a two-layer film made of chromium Cr and chromium oxide) is formed on a transparent substrate by a sputtering method or the like, and is then patterned into a desired shape by using a photolithographic method, thereby forming the black mask 3. Incidentally, a resin film may also be substituted for such a metal film.

Figure 9A:
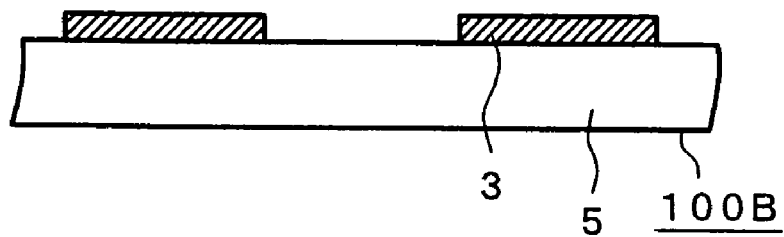
FIGS. 9A to 9D are a schematic process diagram showing the process of forming a base portion on which to provide a spacer of the liquid crystal display device according to the embodiment of the invention.
Figure 9B:
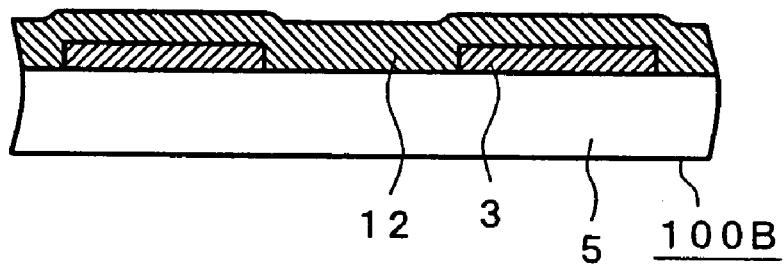
Figure 9C:
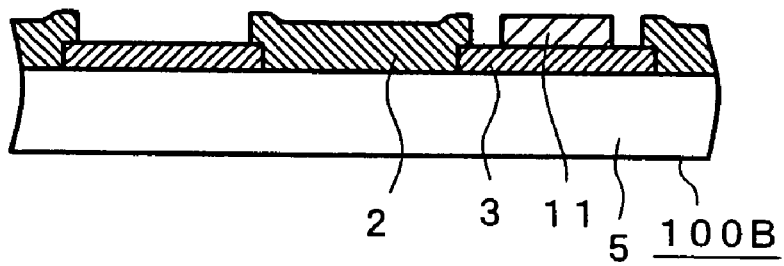
Figure 9D:
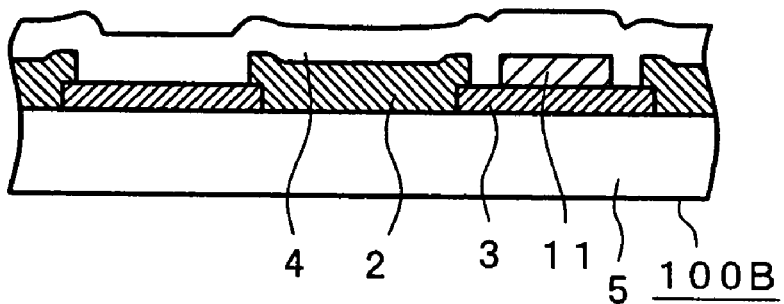

Then, in the step shown in FIG. 9B, a resist material 12 which is mixed with a pigment to absorb light of particular wavelength is dropped onto the substrate on which the black mask 3 has been formed. The resist material 12 is applied so that a uniform film thickness is obtained, and is dried. In the step shown in FIG. 9C, the dried resist material 12 is patterned by using a photolithographic method or the like, thereby forming the color filter 2. At the same time, the base pattern 11 is also formed by patterning. Then, in the step shown in FIG. 9D, the protective film 4 is formed to cover the color filter 2 and the base pattern 11.

During the patterning of the base pattern 11 by the use of a photomask, if the shape of the base pattern 11 is small, the amount of exposure decreases owing to diffraction of light, depending on the distance between the photomask and the substrate. Since a negative type of resist material is used, if the amount of exposure is small, the resist material becomes easy to remove and the height of the base pattern 11 can be decreased. For this reason, by changing the shape of the base pattern 11, it is possible to adjust the height of the base pattern 11.

Figure 10A:
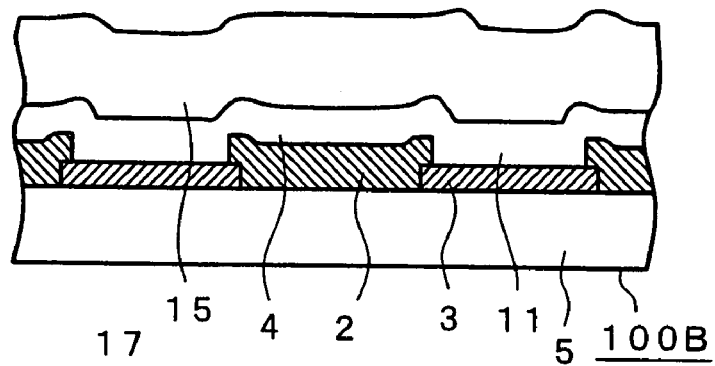
FIGS. 10A to 10C are a schematic process diagram showing the process of forming a spacer of the liquid crystal display device according to the embodiment of the invention.
Figure 10B:
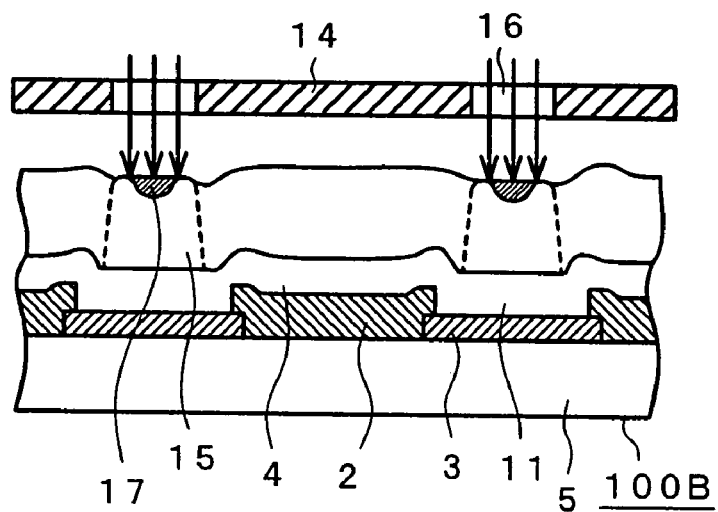
Figure 10C:
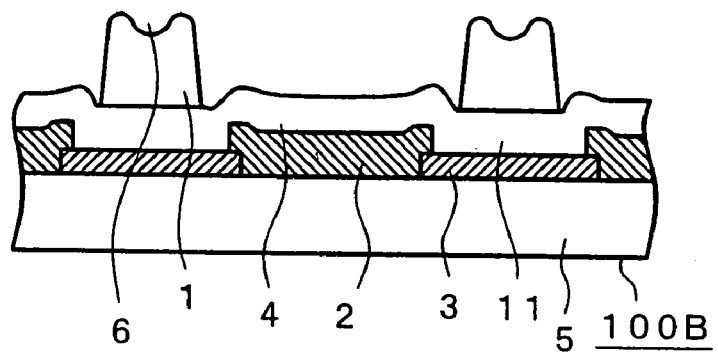

FIGS. 10A to 10C show a process diagram for forming the spacers 1. In the step shown in FIG. 10A, first, a substrate on which the protective film 4 (leveling film) is formed on the black mask 3 and the color filter 2 is prepared. Then, precleaning and drying are performed on the substrate on which the protective film 4 is formed, and subsequently, an aqueous solution type of resist material 13 is dropped onto and applied to the substrate. The resist material 13 is dried and formed into a film. Then, in the step shown in FIG. 10B, a photomask 14 is arranged in position and light 16 is irradiated onto portions 15 in each of which to form the spacer 1, thereby effecting exposure. At this time, portions 17 each having an insufficient amount of exposure are formed as shown in FIG. 10B owing to diffraction of light as the result of the relationship between the shape of the photomask 14 and the distance between the photomask 14 and the resist material 13. Then, as shown in FIG. 10C, the unexposed portion of the resist material 13 is removed with a remover. In the portions 15 which are sufficiently exposed by the use of the photomask 14, the polymerization reaction of a resin which constitutes the resist material 13 proceeds and its molecular weight increases, so that the portions 15 become difficult to solve with the remover, as compared with a portion which is not irradiated with the light 16. On the other hand, the portions 17 having an insufficient amount of light become slightly easy to solve with the remover, as compared with the portions 15 which are sufficiently exposed. For this reason, when the resist material 13 is immersed to remove the unexposed portion of the resist material 13, the resin of the portions 17 each having an insufficient amount of exposure is solved by a small amount. Accordingly, the depressions 6 are respectively formed on the top portions of the spacers 1.

Figure 11A:
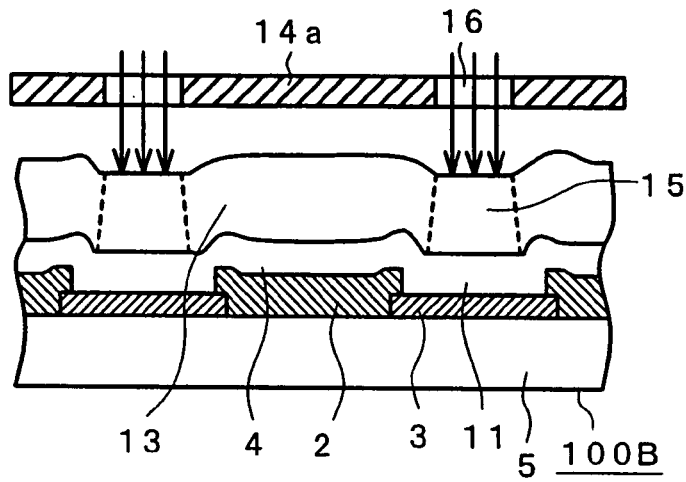
FIGS. 11A to 11C are a schematic process diagram showing the process of forming a spacer of the liquid crystal display device according to the embodiment of the invention.
Figure 11B:
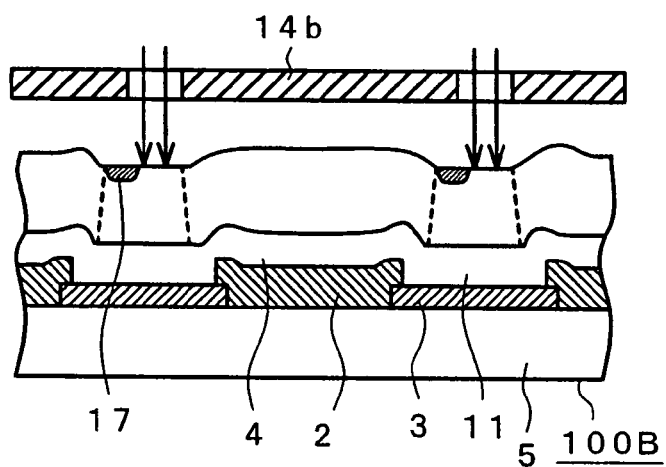
Figure 11C:
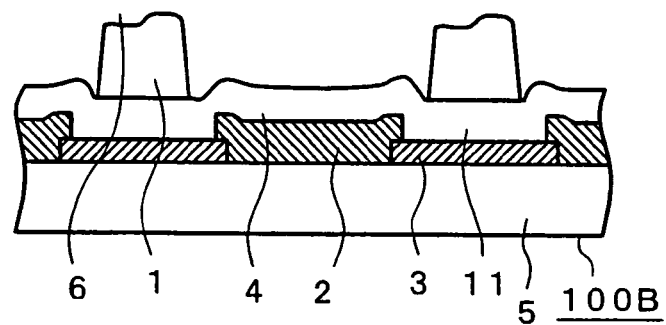

FIGS. 11A to 11C show a process diagram for forming the spacers 1 each having the depression 6 by changing the amount of exposure by using two kinds of photomasks. In the step shown in FIG. 11A, first, the aqueous solution type of resist material 13 is applied to a substrate on which the black mask 3, the color filter 2 and the protective film 4 are formed. Then, a photomask 14a is arranged in position and the light 16 is irradiated onto the portions 15 in each of which to form the spacer 1, thereby effecting exposure. After that, in the step shown in FIG. 11B, a photomask 14b is used to irradiate the light 16, but during this time, portions 17 which are not sufficiently exposed are formed according to the difference in shape between the photomasks 14a and 14b. After that, the unexposed portion of the resist material 13 is removed with a remover, whereby the spacers 1 are formed. As shown in FIG. 11C, since the portions 17 which are not sufficiently exposed are solved with a small amount of remover, the depressions 6 (steps) are respectively formed on the spacers 1.

Figure 12:
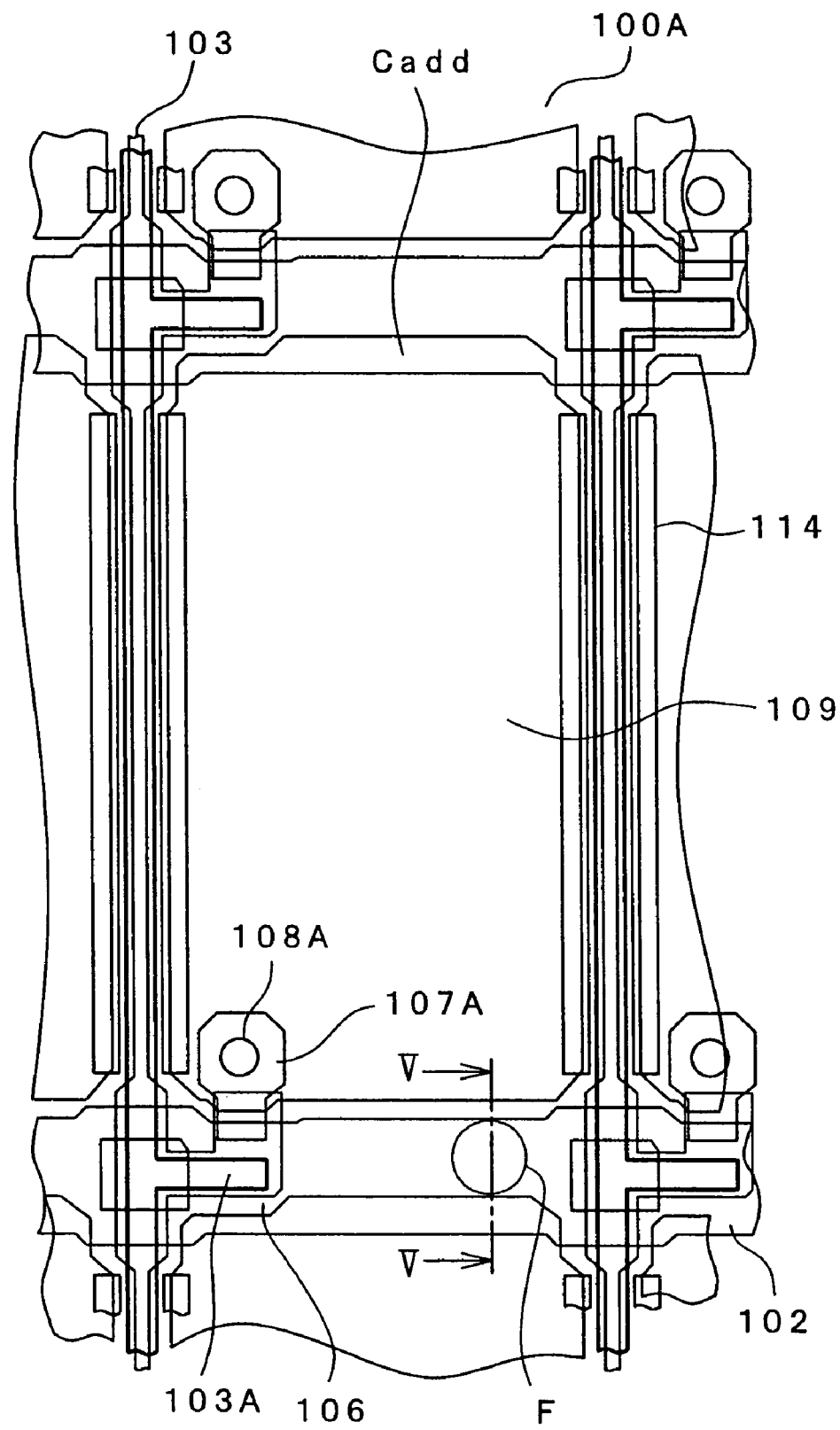
FIG. 12 is a schematic plan view showing the construction of a pixel structure of the liquid crystal display device according to the embodiment of the invention.

The case in which the spacers 1 are provided in a so-called vertical electric field type of liquid crystal display device will be described below with reference to FIG. 12. In the vertical electric field type of liquid crystal display device, an electric field is applied to a liquid crystal layer provided between an electrode formed on one of two opposed substrates and an electrode formed on the other, thereby changing the alignment direction of the liquid crystal layer. FIG. 12 is a view showing the construction of one pixel area of the so-called vertical electric field type of liquid crystal display device, and is a plan view showing the liquid-crystal-side surface of the TFT substrate 100A which is disposed in opposition to the color filter substrate 100B with the liquid crystal interposed therebetween.

Within a liquid crystal panel, individual pixels are disposed in matrix form to constitute a display part. Although FIG. 12 shows one pixel for the sake of simplicity in illustration, adjacent pixels exist, respectively, on the right, left, top and bottom side of the one pixel shown in FIG. 2, and the construction of each of the adjacent pixels is the same as that of the one pixel shown in FIG. 12.

As shown in FIG. 12, the gate signal lines 102 which are extended in the horizontal (x) direction and are juxtaposed in the vertical (y) direction are formed on the surface of the TFT substrate 100A. These gate signal lines 102 are made of a material such as chromium (Cr).

Each adjacent one of the gate signal lines 102, together with each adjacent one of the drain signal lines 103 to be described later (which are extended in the vertical (y) direction and are juxtaposed in the horizontal (x) direction in FIG. 12), is formed to surround a rectangular area, and the rectangular area constitutes one pixel area.

Light shield films 114 which are disposed in parallel with and adjacently to the respective drain signal lines DL are formed in the pixel area, and these light shield films 114 are formed at the same time that, for example, the gate signal lines 102 are formed.

These light shield films 114, together with the black mask 3 formed on a color filter substrate (not shown), have the function of separating substantial pixel areas, and since the light shield films 114 are formed on the TFT substrate 100A on which the pixel electrode 109 which will be described later is formed, the light shield films 114 can be formed without the risk of positional deviation.

The insulating film 105 (refer to FIG. 13) which is made of, for example, SiN is formed on the entire surface of the TFT substrate 100A on which the gate signal lines 102 and the light shield films 114 are formed in the above-described manner. This insulating film 105 has the function of an interlayer insulating film between the gate signal lines 102 and the drain signal lines 103 which will be described later, the function of gate insulating films for the thin film transistors TFT (which will be described later) in areas in which the respective thin film transistors TFT are formed, and the function of dielectric films for the additional capacitances Cadd (which will be described later) in areas in which the respective added capacitances Cadd are formed Each of the thin film transistors TFT is formed to be superposed on the gate signal line 102 at the bottom left of the pixel area as viewed in FIG. 12, and in this area, the semiconductor layer 106 which is formed of, for example, a-Si (amorphous silicon) is formed on the insulating film 105.

The drain electrode 103A and a source electrode 107A are formed on the surface of the semiconductor layer 106, thereby forming a thin film transistor having a reversed-staggered structure which has a gate electrode made of a part of the gate signal line 102 and a gate insulating film made of a part of the insulating film 105.

The drain signal line 103 is formed of, for example, chromium (Cr), and plural drain signal lines 103 are formed to be extended in the vertical (y) direction and to be juxtaposed in the horizontal (x) direction.

A portion of the drain signal line 103 is extended to the surface of the semiconductor layer 106 in an area in which the thin film transistor TFT is formed, whereby the drain electrode 103A of the thin film transistor TFT is formed.

The source electrode 107A of the thin film transistor TFT which is disposed in opposition to the drain electrode 103A is formed at the same time that the drain signal line 103 is formed.

A protective film 108 (refer to FIG. 13) which is made of, for example, SiN is formed on the entire surface of the TFT substrate 100A on which the required electrodes are formed, and a contact hole 108A is formed in the protective film 108 over the central portion of an extended portion of the source electrode 107A.

Furthermore, the transparent pixel electrode 109 which is made of, for example, ITO (Indium-Tin-Oxide) is formed on the top surface of the protective film 108. As shown in FIG. 12, this pixel electrode 109 is formed in an area surrounded by adjacent ones of the gate signal lines 102 and adjacent ones of the drain signal lines 103.

In this case, at the time of formation of the pixel electrode 109, the pixel electrode 109 can be connected to the source electrode 107A through the contact hole 108A.

One of the adjacent gate signal lines 102 underlies the thin film transistor TFT through which to supply a video signal to the pixel electrode 109, and one side of the pixel electrode 109 is formed to be superposed on part of the other of the adjacent gate signal lines 102 along its entire length, thereby constituting the capacitance element Cadd.

The capacitance element Cadd uses as its dielectric film the insulating film 105 and the protective film 108 that are provided between the gate signal line 102 and the pixel electrode 109, and the capacitance value is related to the area of superposition of the pixel electrode 109 on the gate signal line 102.

This capacitance element Cadd has a function such as causing a video signal to be stored in the pixel electrode 109 for a comparatively long period after the thin film transistor TFT is turned off.

The alignment film 111 (refer to FIG. 13) which abuts on the liquid crystal is formed on the entire surface of the TFT substrate 100A on which the pixel electrodes 109 are formed in the above-described manner, so that the initial alignment direction of the liquid crystal is determined by the alignment film 111.

The color filter substrate 100B is disposed in opposition to the TFT substrate 100A which is constructed in this manner, with the liquid crystal being interposed therebetween.

Figure 13:
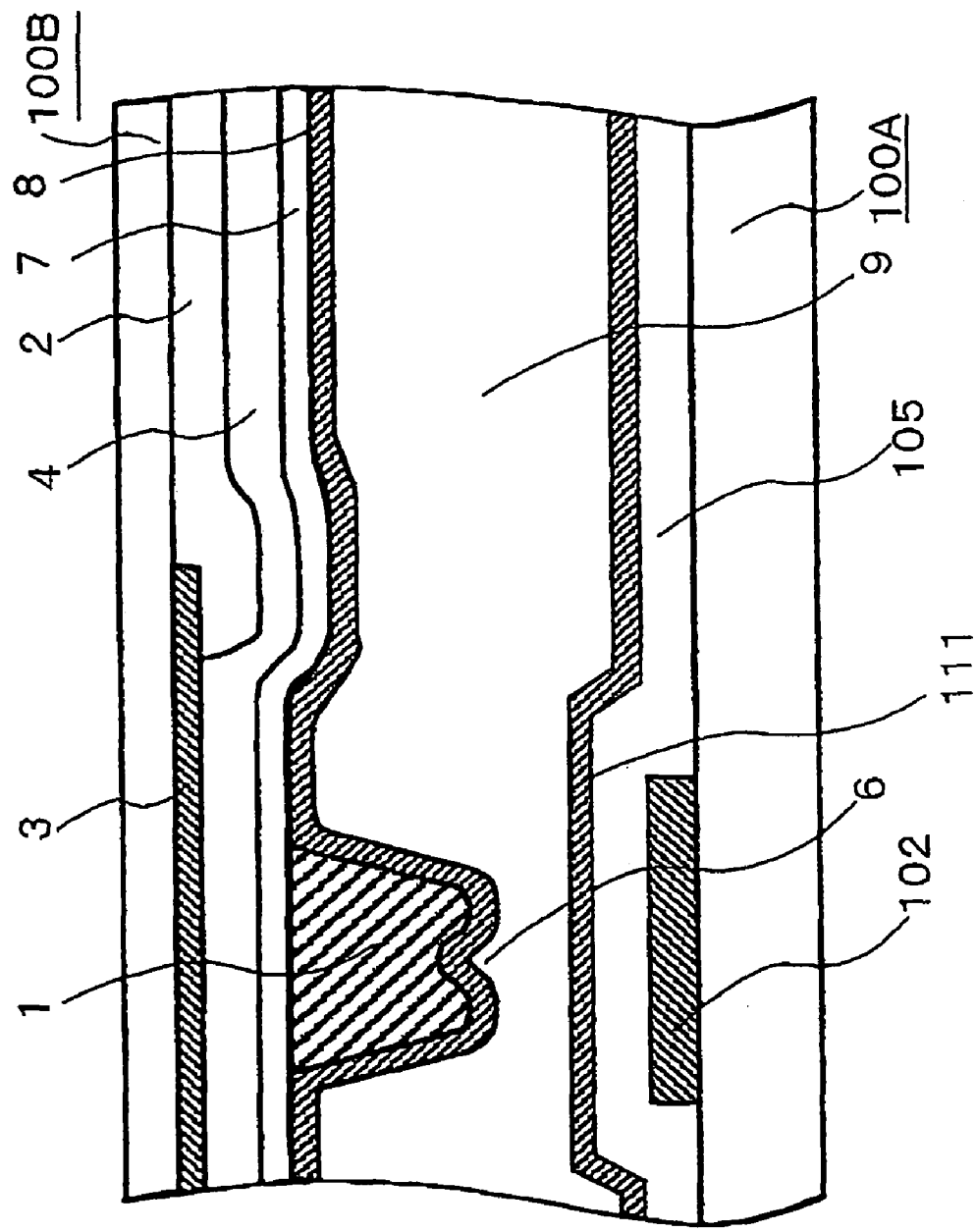
FIG. 13 is a schematic plan view showing a spacer of the liquid crystal display device according to the embodiment of the invention.

FIG. 13 is a cross-sectional view taken along line V-V of FIG. 12, and shows the spacer 1 provided at a position indicated at F in FIG. 12. FIG. 13 shows the color filter substrate 100B as well as the TFT substrate 100A, and is a cross-sectional view showing the state in which the TFT substrate 100A and the color filter substrate 100B are assembled.

As shown in FIG. 13, the black mask 3 which separates the individual pixel areas is formed on the liquid-crystal-side surface of the color filter substrate 100B, and the color filters 2 for predetermined colors are formed in the respective apertures of the black mask 3. The protective film (leveling film) 4 is formed to cover the black mask 3 and the color filters 2. A common electrode 7 which is common to the individual pixel areas and is made of, for example, ITO is formed on the entire surface of the protective film 4. The spacer 1 is formed on the common electrode 7. In addition, the alignment film 8 which abuts on the liquid crystal is formed on the entire surface of the common electrode 7 on which the spacer 1 is provided.

A position at which the spacer 1 is formed is intermediate between the black mask 3 and the gate signal line 102. Since the gate signal line 102 has a wide line width compared to the drain signal line 103, the positioning of the spacer 1 that is required to dispose the spacer 1 at a flat position is easy compared to the case of disposing the spacer 1 on the drain signal line 103.

Figure 14:
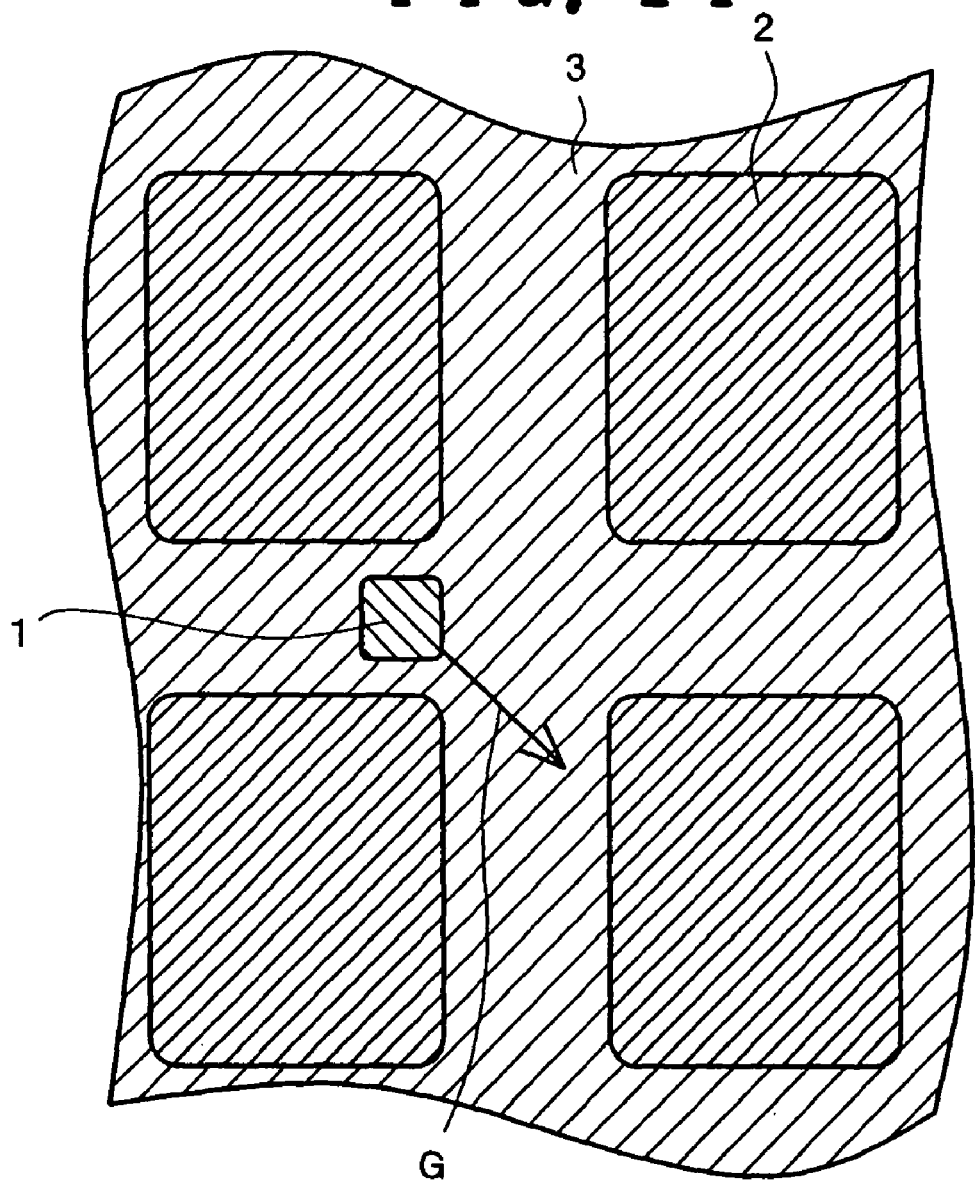
FIG. 14 is a schematic plan view of a color filter substrate, showing a position at which to provide a spacer of the liquid crystal display device according to the embodiment of the invention.

FIG. 14 shows the position of the spacer 1 on the color filter substrate 100B in the case where the spacer 1 is provided at the position indicated at F in FIG. 12. The spacer 1 is provided on the black mask 3 and is hidden so as not to stand out during the observation of the liquid crystal display device. In addition, in the vertical electric field type of liquid crystal display device, its initial alignment direction is an oblique direction with respect to the drain signal line 103 as shown by an arrow G in FIG. 14, so that alignment defect due to the spacer 1 is difficult to hide on the drain signal line 103. For this reason, the spacer 1 is provided near the intersection of the drain signal line 103 and the gate signal line 102, and is provided at a position where the area of the black mask 3 can be utilized as an area which is wide in the oblique direction.

Figure 15:
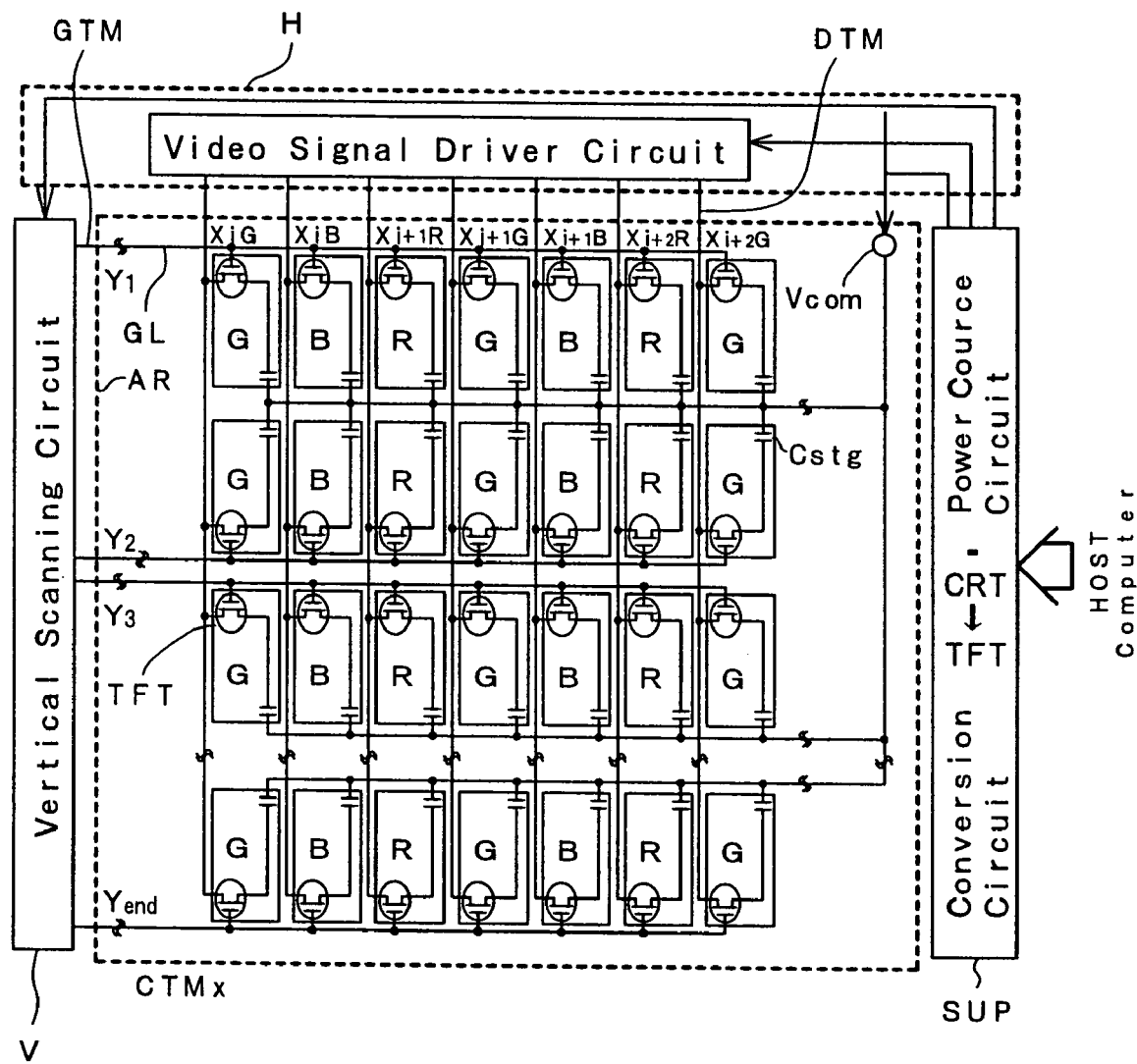
FIG. 15 is a schematic circuit diagram showing the circuit of the liquid crystal display device according to the embodiment of the invention.

The equivalent circuit and its peripheral circuit of a display part which includes the pixels of the liquid crystal display device will be described below with reference to FIG. 15. FIG. 15 is a circuit diagram which is drawn to correspond to an actual geometric arrangement. Sign AR denotes a matrix array in which plural pixels are arrayed two-dimensionally.

In FIG. 15, sign "X" means any one of the video signal lines 103, and suffixes "G", "B" and "R" are added to the sign "X" to correspond to green, blue and red pixels, respectively. Sign "Y" means any one of the gate signal lines 102, and suffixes "1", "2", "3", . . . , and "end" are added to the sign "Y" in accordance with the sequence of scanning timing.

The gate signal lines Y (whose suffixes are omitted) are connected to a vertical scanning circuit V, and the drain signal lines X (whose suffixes are omitted) are connected to a video signal driver circuit H. A circuit SUP includes a power source circuit for obtaining a plurality of divided stabilized voltage sources from one voltage source, and a circuit for exchanging information for a CRT (cold cathode ray tube) received from a host (a host computer) into information for the liquid crystal display device.

Figure 16:
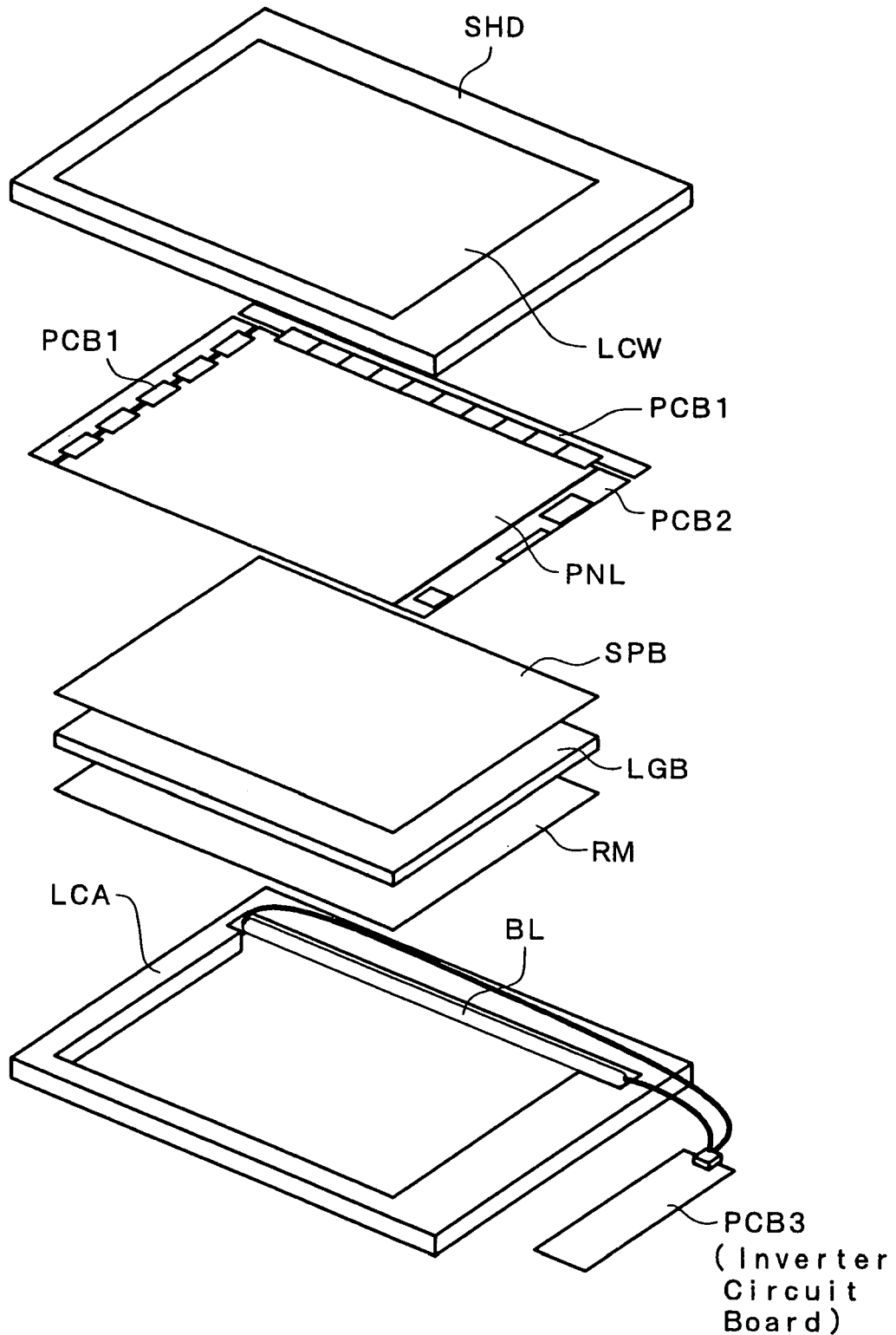
FIG. 16 is a schematic construction diagram showing the construction of constituent parts of the liquid crystal display device according to the embodiment of the invention.

The construction of constituent parts of the liquid crystal display device will be described below with reference to FIG. 16. FIG. 16 is an exploded perspective view illustrating individual constituent parts of the liquid crystal display device. Sign SHD denotes a frame-shaped shield case (a metal frame) made from a metal plate, sign LCW denotes a display window, sign PNL denotes a liquid crystal panel, sign SPB denotes an optical diffusion sheet, sign LCB denotes a light guide, sign RM denotes a reflecting sheet, sign BL denotes a backlight fluorescent tube, and sign LCA denotes a backlight case. The liquid crystal display device is assembled by stacking these members in the shown layered arrangement.

The liquid crystal display device is secured as a whole by hooks and claws provided on the shield case SHD. The backlight case LCA has a shape which accommodates the backlight fluorescent tube BL, the optical diffusion sheet SPB, the light guide LCB and the reflecting sheet RM, and converts the light of the backlight fluorescent tube BL arranged on a side of the light guide LCB into backlight which becomes uniform on a display screen, by means of the light guide LCB, the reflecting sheet RM and the optical diffusion sheet SPB, and emits the backlight to the liquid crystal display panel PNL. An inverter circuit board PCB3 is connected to the backlight fluorescent tube BL and serves as the power source of the backlight fluorescent tube BL.

In the invention, as described hereinabove, spacers which dispersively bear a temporarily large load only when it is applied are disposed in addition to spacers which retain the gap between substrates. Ordinarily, only the necessary minimum number of spacers function, but when a large load is temporarily applied from the outside, auxiliary spacers dispersively bear the load, whereby it is possible to achieve the advantage of preventing irreversible deformation of the spacers.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
a first substrate;
a liquid crystal layer;
a second substrate;
a plurality of gate signal lines and a plurality of drain signal lines which are formed on the second substrate;
a plurality of pixel regions which are defined in a pair of the gate signal lines and a pair of the drain signal lines;
at least one spacer region having a plurality of spacers and being formed on the first substrate and located in-between adjacent pixel regions, heights of the spacers in the spacer region from the first substrate being substantially the same; and
two metal layers sandwiching an insulating layer are formed in a position facing a first spacer in the spacer region on the second substrate, wherein
only one of the two metal layers and the insulating layer are formed in another position facing a second spacer in the spacer region on the second substrate, and
the liquid crystal layer is interposed between the second spacer and the second substrate.

2. A liquid crystal display device according to claim 1, wherein when the first substrate is not subjected to an external force and not elastically deformed, said first spacer in the spacer region touches a corresponding position on the second substrate, and said second spacer in the spacer region does not touch a corresponding position on the second substrate.

3. A liquid crystal display device according to claim 1, wherein the spacers in the spacer region are formed on a black matrix.

4. A liquid crystal display device according to claim 1, wherein one of the two metal layers constitutes a part of one of the drain signal lines.

5. A liquid crystal display device, according to claim 4, wherein a width of the one of the drain signal lines is wider than a width of the respective spacer.

6. A liquid crystal display device comprising:
a first substrate;
a liquid crystal layer;
a second substrate;
a plurality of gate signal lines and a plurality of drain signal lines which are formed on the second substrate;
a plurality of pixel regions which are defined in a pair of the gate signal lines and a pair of the drain signal lines;
at least one spacer region having a plurality of spacers and being formed on the first substrate and located in-between adjacent pixel regions, heights of the spacers in the spacer region from the first substrate being substantially the same; and
at least a first metal layer, an insulation layer and a second metal layer formed in a position facing a first spacer in the spacer region on the second substrate,
wherein the second metal layer is not formed in a position facing a second spacer in the spacer region on the second substrate, and
wherein the liquid crystal layer is interposed between the second spacer and the second substrate.

7. A liquid crystal display device according to claim 6, wherein when the first substrate is not subjected to an external force and not elastically deformed, said first spacer in the spacer region touches a corresponding position on the second substrate, and said second spacer in the spacer region does not touch a corresponding position on the second substrate.

8. A liquid crystal display device according to, claim 6, wherein the spacers in the spacer region are formed on a black matrix.

9. A liquid crystal display device according to claim 6, wherein said metal layer constitutes a part of one of the gate signal lines.

10. A liquid crystal display device according to claim 9, wherein a width of the one of the gate signal lines is wider than a width of the respective spacer.

* * * * *